United States Patent
Takahashi

(10) Patent No.: US 7,096,425 B1
(45) Date of Patent: Aug. 22, 2006

(54) DICTIONARY APPARATUS FOR PREPARING AND DISPLAYING FORM WITH KEYWORD ENTRIES FROM ENTERED WORD STRING

(75) Inventor: Kunikazu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/452,925

(22) Filed: Dec. 2, 1999

(30) Foreign Application Priority Data

Dec. 15, 1998 (JP) .................................. 10-355472

(51) Int. Cl.
*G06F 15/00* (2006.01)
(52) U.S. Cl. ...................... 715/532; 715/506; 715/507; 715/508; 715/530
(58) Field of Classification Search ................ 715/532, 715/500.1, 530, 506, 507, 508, 501.1; 707/3, 707/5, 6
See application file for complete search history.

(56) References Cited

U.S. PATENT DOCUMENTS

| | | | | |
|---|---|---|---|---|
| 4,654,873 A | * | 3/1987 | Fujisawa et al. ............. 382/178 |
| 4,688,192 A | * | 8/1987 | Yoshimura et al. ........... 704/10 |
| 5,490,061 A | * | 2/1996 | Tolin et al. .................... 704/2 |
| 5,493,677 A | * | 2/1996 | Balogh et al. ............ 707/104.1 |
| 5,625,814 A | * | 4/1997 | Luciw ............................ 707/5 |
| 5,649,221 A | * | 7/1997 | Crawford et al. ............. 715/532 |
| 5,678,054 A | * | 10/1997 | Shibata ....................... 715/532 |
| 5,774,859 A | * | 6/1998 | Houser et al. ............... 704/275 |
| 5,956,711 A | * | 9/1999 | Sullivan et al. ................ 707/6 |
| 5,978,798 A | * | 11/1999 | Poznanski et al. ............. 707/4 |
| 6,078,914 A | * | 6/2000 | Redfern ......................... 707/3 |
| 6,112,172 A | * | 8/2000 | True et al. ................... 704/235 |
| 6,112,215 A | * | 8/2000 | Kaply .......................... 715/507 |
| 6,201,894 B1 | * | 3/2001 | Saito ........................... 382/176 |
| 6,202,064 B1 | * | 3/2001 | Julliard ........................... 707/5 |
| 6,269,361 B1 | * | 7/2001 | Davis et al. .................... 707/3 |

OTHER PUBLICATIONS

David Moseley et al., Office 97 Professional Edition, Microsoft, Copyright 1997, pp. 151-154.*

* cited by examiner

*Primary Examiner*—Stephen Hong
*Assistant Examiner*—Matthew Ludwig
(74) *Attorney, Agent, or Firm*—Katten Muchin Rosenman LLP

(57) ABSTRACT

An information entry apparatus and an information entry system provided with that apparatus which enable the efficient entry of required information in real time in a plurality of corresponding fields of a screen by an information entry operation of a level of simplicity equal to that of writing a memo about a case, the information entry apparatus provided with an alphanumeric entry unit for entering alphanumeric string information, a display unit for displaying keywords comprised of predetermined alphanumeric strings in a plurality of corresponding fields on a display screen, a word dictionary for storing a plurality of keywords corresponding to the plurality of fields and a plurality of similar words for deducing those keywords linked with each of those keywords, and an alphanumeric information processing unit for cutting out predetermined word strings from the entered alphanumeric string, searching through the word dictionary by the cut out words, extracting corresponding group of keywords from a dictionary column for which matches are obtained by comparison with keywords of the dictionary or similar words, and displaying these all at once in the plurality of corresponding fields of the display unit.

17 Claims, 25 Drawing Sheets

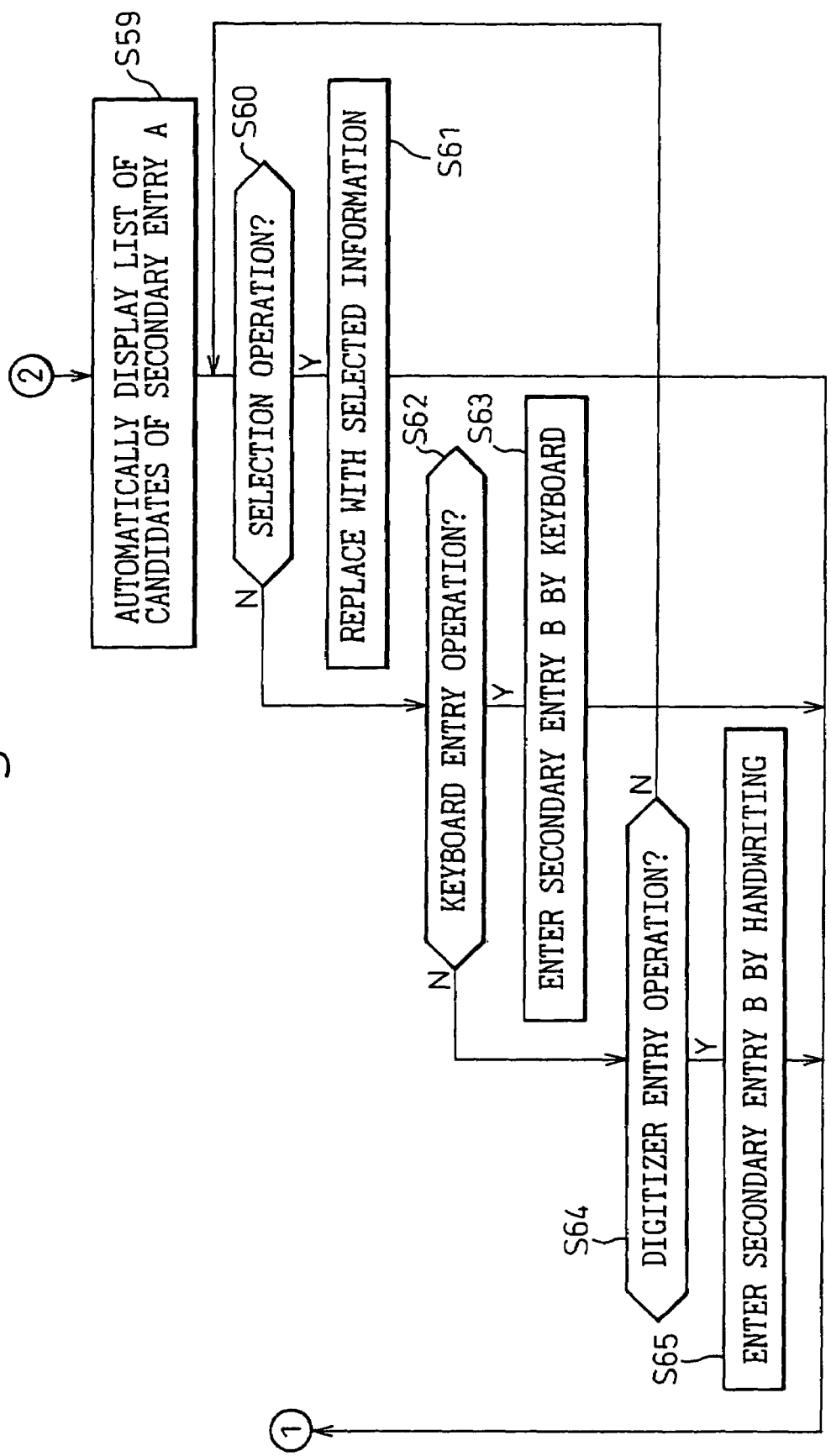

Fig.9

| CASE NAME 1 | | CASE NAME 2 | |

STATION IN CHARGE

TIME OF OCCURRENCE: HR__MIN__MONTH__DAY__YEAR

LOCATION OF OCCURRENCE

CALLER     CALLING MEANS

COMMANDED UNIT     RESULT OF PROCESSING

HEAVY   DRINK BAR
TWO   GANGSTERS
SMASHING   STORE
22:30

ENTER   MOVE FIELD   CONFIRM

Fig.10A

RECEIPT No.: 123    LINE NAME:xx

RECEIPT TIME: 23 HR 10 MIN 8 MONTH 23 DAY 1998 YEAR    PROCESSOR: BBB

END TIME: __ HR __ MIN __ MONTH __ DAY __ YEAR                                    SECONAARY ENTRY A

CASE NAME 1: PROPERTY DAMAGE    CASE NAME 2: _____    CONT.    | EXTORTION |

RELATED No.: _____    RELATED CASE NAME: _____    EMERGENCY DISPATCH ETC.: _____

STATION IN CHARGE: AAA    RADIO DISPATCHER: _____

TIME OF OCCURRENCE: 22 HR 30 MIN 8 MONTH 23 DAY 1998 YEAR                         SECONAARY ENTRY A

LOCATION OF OCCURRENCE: BAR HEAVY DRING,                       | BAR HEAVY DRINKERS,5215, |
                        235 CCC ST,BBB CITY                    | DDD ST,EEE CITY          |

DIRECTION OF FLIGHT: _____
MEANS OF FLIGHT: _____
-VEHICLE-
MODEL: _____ COLOR: _____
NUMBER: _____
CHARACTERISTICS: _____
-PERPETRATOR-
GENDER: <u>MALE</u> HEIGHT: ___ cm TO ___ cm
BUILD: _____ HAIR: _____
FACE: _____ SUBJECT TYPE: <u>LIKE GANGSTER</u>
CLOTHING: _____
WEAPON: _____ ITEMS CARRIED: _____ . . . .

Fig.11A

| CASE NAME (KEYWORD) | SIMILAR WORDS | | |
|---|---|---|---|
| THEFT | ROB | BREAKING AND ENTERING | PICKPOCKET |
| EXTORTION | THREAT | BREAKING | |
| KIDNAPING | ABDUCTION | THREATENING CALL | |
| HIT AND RUN | RUN OVER | | |
| ACCIDENT INVOLVING PERSONAL INJURY | PERSONAL INJURY | RUN OVER | INJURY |
| ACCIDENT INVOLVING PROPERTY DAMAGE | PROPERTY DAMAGE | BROKEN | |
| PARKING VIOLATION | PARKING | | |
| TRAFFIC VIOLATION | SPEEDING | RECKLESS DRIVING | |
| INTOXICATION | DRUNK | | |
| MISSING CHILD | MISSING | | |
| SICK PERSON | SICK | COLLAPSED | |
| INJURED PERSON | INJURED | COLLAPSED | |
| RUNAWAY | LEFT HOME | | |
| NATURAL DISASTER | EARTHQUAKE | FLOODING | LIGHTNING |
| ACCIDENT | CRASH | BROKEN | |
| FIRE | FLAMES | BURNING | SMOKE |
| FIGHT | ARGUMENT | DISORDERLY | INJURY |
| NOISE | LOUD | RACING | |
| SMELL | ODOR | STINK | TEARING |
| : | | | |

Fig.11B

| ADDRESS | NAME | ABBREVIATION |
|---|---|---|
| 123 AAA ST., BBB CITY | BBB POST OFFICE | ZIP CODE 11111 |
| 3525 AAA ST., BBB CITY | AAA BANK, DDD BRANCH | |
| 235 CCC ST., BBB CITY | HEAVY DRINK BAR | |
| 5215 DDD ST., EEE CITY | HEAVY DRINKERS BAR | |
| : | : | : |

Fig.12A

| TIME OF OCCURRENCE | ENTRY |
|---|---|
| AA/BB/98 CC:DD | MM/DD HH:MM |
| 08/23/98 CC:DD | HH:MM |

Fig.12B

| STATION IN CHARGE | LOCATION OF OCCURRENCE |
|---|---|
| AAA STATION | 111 AAA ST., BBB CITY |
| | 222 AAA ST., BBB CITY |
| | 333 AAA ST., BBB CITY |
| BBB STATION | 111 BBB ST., CCC CITY |
| MOBILE INVESTIGATION SQUAD | : |
| : | : |

Fig.12C

| GENDER (KEYWORD) | SIMILAR WORDS | | |
|---|---|---|---|
| MALE | GANGSTER | TRANSVESTITE | GAY |
| FEMALE | WOMAN | | |
| UNKNOWN | GENDER UNKNOWN | | |

Fig.13A

| SUBJECT TYPE (KEYWORD) | SIMILAR WORDS | | |
|---|---|---|---|
| WHITE COLLAR | WHITE COLLAR | EMPLOYEE | COMPANY EMPLOYEE |
| GANGSTER | MAFIA | MOBSTER | M |
| STUDENT | STUDENT | COLLEGE STUDENT | HIGH SCHOOL STUDENT |
| BLUE COLLAR | WORKER | UNEMPLOYED | |
| GANG MEMBER | GANG | GM | |
| MENTALLY DISTURBED | STRANGE BEHAVIOR | STALKER | MD |

Fig.13B

| FORM NAME | CASE NAME | | | | |
|---|---|---|---|---|---|
| PENAL OFFENSE (1) | THEFT | BURGLARY | | | |
| KIDNAPING (2) | KIDNAPPING | | | | |
| HIT AND RUN (3) | HIT AND RUN | | | | |
| TRAFFIC ACCIDENT (4) | ACCIDENT INVOLVING PERSONAL INJURY | ACCIDENT INVOLVING PROPERTY DAMAGE | | | |
| TRAFFIC VIOLATION (5) | PARKING VIOLATION | TRAFFIC REGULATIONS | | | |
| PROTECTION AND RESCUE (6) | DRUNK | MISSING CHILD | SICK PERSON | INJURED PERSON | RUNAWAY |
| ACCIDENT AND DISASTER (7) | NATURAL DISASTER | ACCIDENT | FIRE | | |
| OTHER (8) | ARGUMENT | NOISE | SMELL | | |

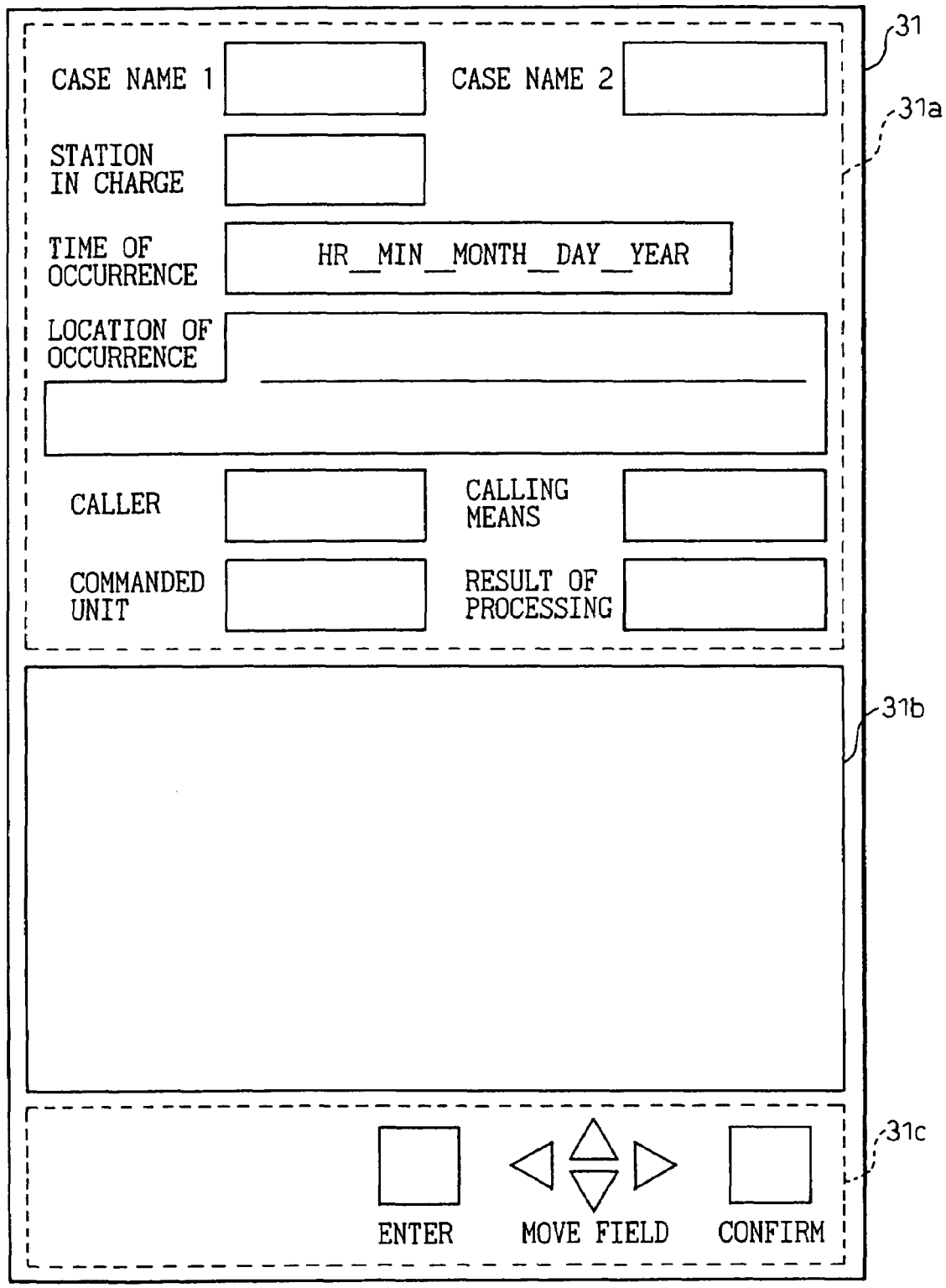

Fig. 16A

RECEIPT No.: _____  LINE NAME: _____  PROCESSOR: _____

RECEIPT TIME: __ HR __ MIN __ MONTH __ DAY __ YEAR

END TIME: __ HR __ MIN __ MONTH __ DAY __ YEAR

CASE NAME 1: _____  CASE NAME 2: _____  CONT. _____

RELATED No.: _____  RELATED CASE NAME: _____

STATION IN CHARGE: _____  RADIO DISPATCHER: _____  EMERGENCY DISPATCH ETC.: _____

TIME OF OCCURRENCE: __ HR __ MIN __ MONTH __ DAY __ YEAR

LOCATION OF OCCURRENCE: _____

DIRECTION OF FLIGHT: _____
MEANS OF FLIGHT: _____
-VEHICLE-
MODEL: _____ COLOR: _____
NUMBER: _____
CHARACTERISTICS: _____
-PERPETRATOR-
GENDER: _____ HEIGHT: ___ cm TO ___ cm
BUILD: _____ HAIR: _____
FACE: _____ SUBJECT TYPE: _____
CLOTHING: _____
WEAPON: _____ ITEMS CARRIED: _____ . . . .

Fig.17A

TYPE OF ACCIDENT: _____

-INJORY-
SERIOUSNESS: _____
No. OF PERSONS: _____
HOSPITAL: _____
-CALLER/NOTIFIER-
NAME: _____ AGE: _____
ADDRESS: _____
TELEPHONE No.: _____   . . . . . . .

Fig.17B

RECEIPT No.: _____ LINE NAME: _____
CASE NAME 1: _____ CASE NAME 2: _____ CONT. _____

-SUSPECT-
NAME: _____ AGE: _____
GENDE: _____ NUMBER OF OTHERS: _____
OCCUPATION: _____
ADDRESS: _____
MODEL OF CAR: _____
CAR COLOR: _____
· · · · · · · · · ·

RESULT

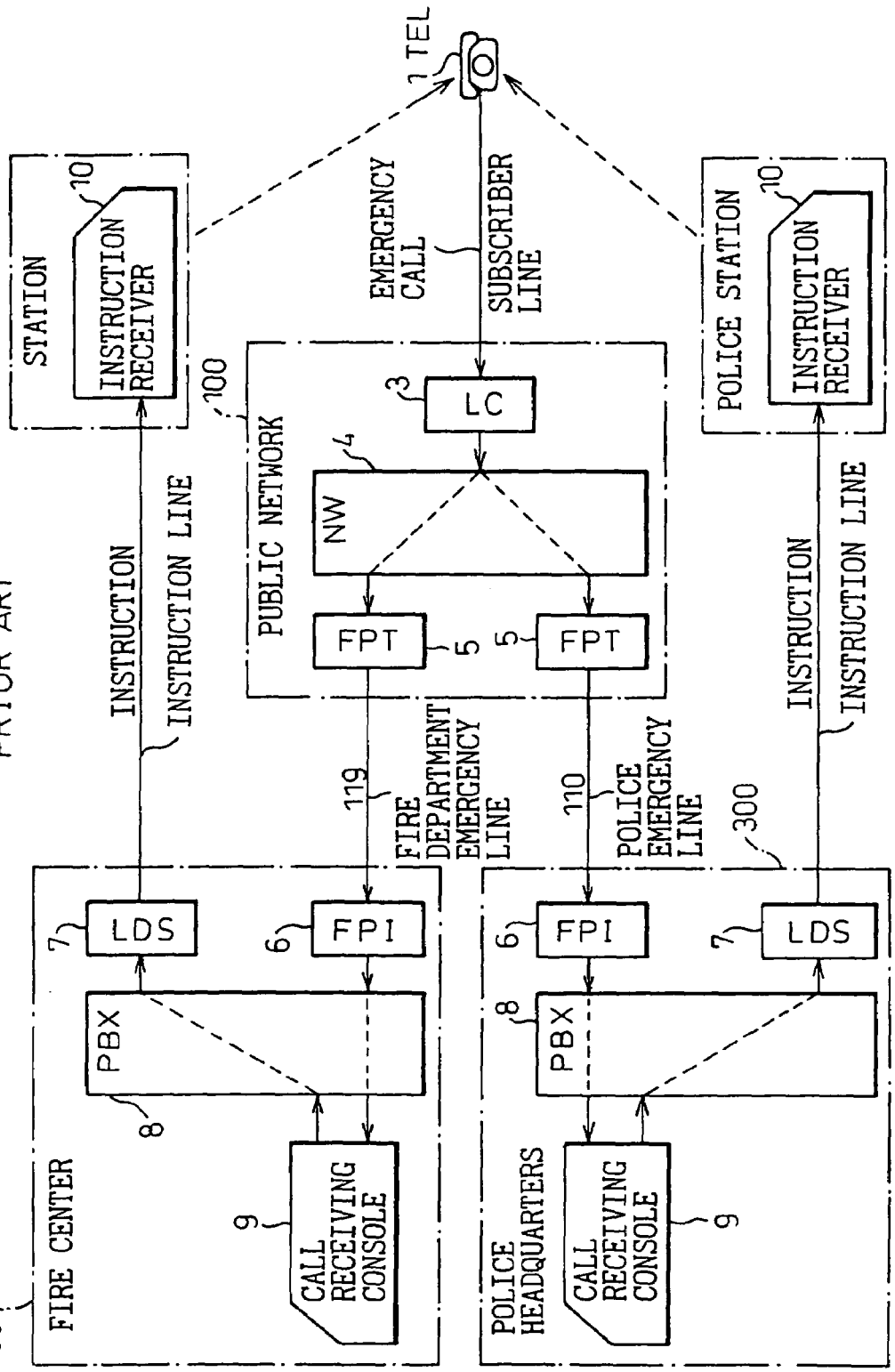

DICTIONARY APPARATUS FOR PREPARING AND DISPLAYING FORM WITH KEYWORD ENTRIES FROM ENTERED WORD STRING

BACKGROUND OF THE INVENTION

1. Field of the Invention

The present invention relates to an information entry apparatus and an information entry system provided with that apparatus, more particularly relates to an information entry apparatus and an information entry system provided with that apparatus suitable for services requiring quick and accurate entry and use of information in a plurality of fields (receiving calls reporting emergencies at fire or ambulance centers and police headquarters, taking reservation for use of public facilities or ticket sales, etc.)

As one example of an information entry system requiring urgency in information entry, there is the command and control system (emergency call) system for receiving emergency calls from subscribers, monitoring and interrupting operations of consoles, issuing instructions to stations, communicating by radio with dispatched ambulances, fire engines, patrol cars, and other vehicles, etc. Such an emergency call system must be quick to process emergency calls and issue instructions due to its social importance.

2. Description of the Related Art

FIG. 18 and FIG. 19 are views for explaining the related art. FIG. 18 shows an outline of an emergency call (command and control) system of the related art. In the figure, reference numeral 1 represents a subscriber telephone (TEL), 100 a public network, 3 a line circuit (LC) terminating the subscriber line, 4 a public network exchange (NW), 5 an emergency call trunk (FPT), 20 a fire or ambulance center, 300 police headquarters, 6 an emergency call receiving trunk (FPI), 7 an instruction line trunk (LDS), 8 a private branch exchange (PBX), 9 an emergency call receiving console, and 10 an instruction receiver at a fire station, police station, etc.

When a subscriber dials a fire or ambulance emergency number by the telephone 1, the call goes through the exchange 4 and the fire or ambulance emergency call circuit of the public network and reaches the private branch exchange 8 of the fire or ambulance center 200 where it is received by the call receiving console 9. The processor processes the received call as required and quickly issues instructions (mainly by voice) to the station in charge. These instructions are sent through the private branch exchange 8 and the instruction line to the instruction receiver 10 of the station in charge. The person receiving it then dispatches an ambulance, fire engine, or other vehicle to the scene in accordance with the information of the oral instructions so that the subscriber can quickly receive emergency services in the case of illness, fire, etc.

When a subscriber dials the police emergency number by the telephone 1, the call goes through the exchange 4 and the police emergency call line of the public network and reaches the private branch exchange 8 of the police headquarters 300 where it is received by the call receiving console 9. The processor processes the received call as required and quickly issues instructions (mainly by voice) to the police station in charge. These instructions are sent through the private branch exchange 8 and the instruction line to the instruction receiver 10 of the station in charge. The person receiving it dispatches a patrol car or policeman etc. to the scene in accordance with the information of the oral instructions so that the subscriber can quickly receive emergency services in the case of a crime or accident.

Note that the communication between the dispatched vehicles and the receiving console 9 is conducted through a not shown radio line. Below, the explanation will focus on a command and control system of a police headquarters of the related art, in particular, the call receiving console, but the same applies to the command and control system, that is, call receiving console, of a fire or ambulance center.

FIG. 19 is a block diagram of a call receiving console of the related art. In the figure, 11 is a CPU for controlling and performing processing for the receiving console, 12 is a main memory (MM) for storing the programs and information to be used by the CPU 11, 13 is a CRT or other display device for displaying several fields of information relating to the case, 14 is a call routing operation panel for manual control of the exchange line system (receipt of emergency calls, monitoring and interruption of voice conversations between consoles, ending calls, etc.), 15 is a circuit interface (CIF) for connecting with the private branch exchange 8, 16 is a headset (HS) for voice use used by the person at the receiving console (processor), 17 is an alphanumeric information entry keyboard (KBD), 18 is a mouse or other pointing device (PD), 19 is a secondary information entry apparatus (digitizer/pen computer entry device/plasma display panel entry device, etc.) for assisting the entry of the alphanumeric information, 20 is a hard disk drive (HDD) used as a secondary memory for storing the program files or information files used by the CPU 11, 22 is a common bus of the CPU 11, and 23 is a paper memo ledger placed on the receiving console.

In addition, while not shown, provision is made of a monitor speaker for monitoring radio calls from the radio vehicles (patrol cars etc.) as they come in, a tape deck for recording the information obtained, etc.

Due to the above configuration, in the past, the processor would write the information obtained from the caller by hand in the memo ledger 23, then sometime after obtaining it would pick out the necessary information while checking the information written in the memo ledger and would use the keyboard 17 to successively enter the name of the case and various other matters identifying the case such as the time of occurrence, location of occurrence, station in charge, etc. using keywords in use in the station in corresponding display fields on the information screen.

Summarizing the problems to be solved by the present invention, in the related art, as described above, it was necessary for the processor to write down the information obtained on paper on a memo ledger, pick out the necessary information from the memo ledger, successively select the display fields and enter the information (keywords), and go through several other troublesome steps. Therefore, not only was time lost from writing the information in the memo ledger to the start of the keyboard entry, but also considerable time was taken for the work of selecting the display fields and entering the information there by a keyboard. In this way, considerable time and effort were required for preparing the case information. Further, the issuance of instructions and dispatch of help to the scene (initial investigation) were delayed and the caller sometimes was not able to receive speedy assistance. Further, if the processor was not yet skilled, he would not notice that certain information was missing at the time of writing the memo and would only find that information was missing when entering information from the keyboard.

Note that in the related art, a system is also known of using a digitizer 19 instead of the memo ledger 23. The memo information entered into this digitizer 19, however, is only recorded as it is electronically. Therefore, after the memo is written, it is necessary to enter the information from the keyboard 17 in the same way as above.

Further, in the related art, a system is known of writing the information in a memo ledger 23 (or entering it in a digitizer 19), then using a pen computer or plasma display panel or other touch entry device (secondary information entry device) 19 to enter information in the corresponding display fields by touch. In this case as well, however, after writing the memo, it is also necessary to extract the necessary information and select the information on the touch panel. Skill and time are required for this work. Further, there are limits as to the information of the fields which can be displayed on a touch panel at one time.

SUMMARY OF THE INVENTION

An object of the present invention is to provide an information entry apparatus and an information entry system provided with that apparatus which enable the efficient entry of required information in real time in a plurality of corresponding fields of a screen by an information entry operation of a level of simplicity equal to that of writing a memo about a case.

The above object can be achieved by the configuration of FIG. 1 for example. That is, the information entry apparatus of a first aspect of the present invention is provided with an alphanumeric entry unit for entering alphanumeric string information, a display unit for displaying keywords comprised of predetermined alphanumeric strings in a plurality of corresponding fields on a display screen, a word dictionary for storing a plurality of keywords corresponding to the plurality of fields and a plurality of similar words for deducing those keywords linked with each of those keywords, and an alphanumeric information processing unit for cutting out predetermined word strings from the entered alphanumeric string, searching through the word dictionary by the cut out words, extracting corresponding group of keywords from a dictionary column for which matches are obtained by comparison with keywords of the dictionary or similar words, and displaying these all at once in the plurality of corresponding fields of the display unit.

According to the first aspect of the present invention, by searching through the word dictionary by an entered alphanumeric string (similar words etc.) and entering the obtained keywords in the display fields, it is possible to suitably enter the desired (required) keywords by just the simple operation of entering as is the alphanumeric string of various types of expressions in general use. Further, by searching through the word dictionary by the entered alphanumeric string (word string) and entering the obtained group of keywords all at once in the plurality of corresponding display fields, it is possible to efficiently enter the required keywords in the plurality of corresponding fields on the screen in real time by just an information entry operation of a level of simplicity of taking down a memo about important information.

Preferably, a second aspect of the present invention constitutes the first aspect wherein the alphanumeric information processing unit searches through the word dictionary by the entered alphanumeric string and successively cuts out from the entered alphanumeric string as predetermined words the words of portions for which matches are obtained by comparison with the keywords of the dictionary or similar words. Therefore, it is possible to efficiently cut out predetermined word strings even from a long alphanumeric string (sentence) entered.

Further, preferably, a third aspect of the present invention constitutes the first aspect wherein further provision is made of a conjugated alphanumeric string information dictionary storing conjugated alphanumeric string information comprised of a plurality of sets of alphanumeric string information elements and the alphanumeric information processing unit searches through the conjugated alphanumeric string information dictionary by predetermined words cut out from the entered alphanumeric string and extracts the overall conjugated alphanumeric string information for which matches are obtained by comparison with part or all of the conjugated alphanumeric string information in the dictionary and displays the same in the corresponding fields of the display unit.

The expression in the third aspect of the present invention is very general, that is, abstract, so giving a specific example, provision is made of an address dictionary storing a plurality of address information comprised of sets of alphanumeric string information elements, that is, an address, name of the person, name of the place, and name of the building or number of the building. The alphanumeric information processing unit searches through the address dictionary by predetermined words cut out from the entered alphanumeric string (part of the address information etc.), extracts the overall address information for which a match is obtained by comparison with part or all of the address information in the dictionary, and displays the same in the corresponding field of the display unit. Therefore, it becomes possible to efficiently enter information relating to the address (location of occurrence of the case etc.) comprised of the address, name of the person, name of the place, and name of the building or number of the building.

Preferably, a fourth aspect of the present invention constitutes the first aspect wherein further provision is made of a keyword dictionary storing a plurality of first keywords corresponding to predetermined display fields of the display unit and a plurality of second keywords in a predetermined relation with the first keywords linked with each of the first keywords and the alphanumeric information processing unit searches through the keyword dictionary by a second keyword displayed in another predetermined display field of the display unit, extracts the corresponding first keyword from the dictionary column for which a match is obtained by comparison with the second keyword of the dictionary, and displays the same in the predetermined display field.

The expression in the fourth aspect of the present invention is very general, that is, abstract, so giving a specific example, further provision is made of a station dictionary (keyword dictionary) storing a plurality of station names (first keywords) for a corresponding display field for the station in charge in the display unit and a plurality of information on locations of occurrence of cases (second keywords) in a predetermined relationship with the names of the stations linked with each of the names of the stations and the alphanumeric information processing unit searches through the station dictionary by the information on the location of occurrence of the case (second keyword) displayed in the display field of the location of occurrence of the case in the display unit, extracts the corresponding name of the station in charge (first keyword) from the dictionary column for which a match is obtained by comparison with the information on the location of occurrence of the case in the dictionary (second keyword), and displays the same in the display field of the station in charge. Therefore, information on the station in charge is automatically entered linked with the entry of the location of occurrence of the case.

Preferably, a fifth aspect of the present invention constitutes the first aspect wherein further provision is made of a form dictionary storing a plurality of form information corresponding to a plurality of types of display formats and one or more keywords corresponding to the form information linked with each of the form information and the alphanumeric information processing unit refers to the form dictionary by a keyword displayed in a predetermined display field of a first screen, extracts the corresponding form information from the dictionary column for which a match is obtained by comparison with the keywords of the dictionary, and displays the screen of the display format corresponding to the form information on a second screen.

The expression in the fifth aspect of the present invention is very general, that is, abstract, so giving a specific example, further provision is made of a form dictionary storing a plurality of form information provided corresponding to the information of cases and one or more case name words corresponding to the form information linked with each of the form information and the alphanumeric information processing unit refers to the form dictionary by the case name word displayed in the case name field of the first screen, extracts the corresponding form information from the dictionary column for which a match is obtained by comparison with the case name words in the dictionary, and displays the same in the second screen corresponding to the form information. Therefore, first the information entry screen (first screen) of the basic (common) information is displayed at the left side of the screen and then a second information entry screen tailored to the information of the display field (in close relation with the information of the display field) can be automatically displayed.

Preferably, a sixth aspect of the present invention constitutes the first aspect wherein the alphanumeric information processing unit is provided with a first entry mode for designating keywords displayed all at once in corresponding fields of the display unit as provisional primary entries and for displaying the keywords of the primary entries by a first alphanumeric color.

While the hit rate of the information (keywords) of the plurality of fields obtained all at once in the first aspect of the present invention is high, it cannot be said to be perfect. Therefore, preferably, in the sixth aspect of the invention, the information is designated as provisional primary entries (which might be changed to other keywords etc.) and is displayed by a first alphanumeric color enabling it to be easily distinguished from other ordinary words.

More preferably, a seventh aspect of the present invention constitutes the sixth aspect wherein the alphanumeric information processing unit is provided with a second entry A mode where one of a plurality of keywords extracted for one display field of the display unit is displayed in the corresponding display field, the remaining keywords are displayed in a list in a display area near the display field, and a keyword displayed in a corresponding display field is replaced by a keyword selected in accordance with a predetermined manual selection operation on the list of keywords. Therefore, judgement of which is the suitable information (keyword) of the display field and selection of the same become easy.

More preferably, an eighth aspect of the present invention constitutes the sixth aspect wherein the alphanumeric information processing unit is provided with a secondary entry B mode where the keyword of the primary entry is directly changed or replaced by alphanumeric information entered from the alphanumeric entry unit. Therefore, the information of the display field of the primary entry can be flexibly and freely modified or changed.

More preferably, a ninth aspect of the present invention constitutes the first or eighth aspects wherein the alphanumeric entry unit is provided with a keyboard, a digitizer and a handwritten alphanumeric recognition unit for recognizing a handwritten alphanumeric string for entry into the digitizer, and/or a microphone and a speech recognition unit for recognizing the speech entered into the microphone.

In the case of the first aspect of the present invention modified by the ninth aspect, it is possible to enter an alphanumeric string, of a level of simplicity of that of writing a memo on important information, by a keyboard, digitizer and handwritten alphanumeric recognition unit, or microphone and speech recognition unit. Whatever the alphanumeric entry unit, the final output is an alphanumeric string (keyed in alphanumeric string, recognized alphanumeric string), so the same processing may be performed on it by the alphanumeric information processing unit.

Note that in the case of entry of a memo by a keyboard, the alphanumeric string (keywords, similar words, etc.) relating to important information may be typed in by a simplified sentence format (sentence format of incomplete type where words are not separated by spaces etc.) Further, when entering a handwritten memo by a digitizer, the alphanumeric string relating to important information may be entered for example by the simplified sentence format such as shown in FIG. 9. Further, when entering a voice memo by a microphone, the words relating to the important information may be entered with suitable pauses between them. Note that in the case of entry by a microphone, the voice of the calling party may be entered as it is or a speech recognition unit may be activated only when the processor is repeating key points and therefore just the voice of the processor entered.

In the case of the eighth aspect of the present invention modified by the ninth aspect, it is possible to enter information of the secondary entry B mode by a keyboard, digitizer and handwritten alphanumeric recognition unit, or microphone and speech recognition unit.

More preferably, a 10th aspect of the present invention constitutes the ninth aspect wherein the digitizer is provided with a handwritten free entry space of a handwritten entry free format and the alphanumeric information processing unit cuts out predetermined word strings from the alphanumeric string handwritten in the handwritten free entry space and recognized by the alphanumeric recognition unit in the order of the handwritten alphanumerics. Therefore, it is possible to write a memo on any information in any format in the handwritten free entry space. Further, at that time, by making separate use of the order of the handwritten alphanumerics, line changes, and other sentence structural information, it is possible to more accurately perform the processing for cutting out predetermined words.

More preferably, an 11th aspect of the present invention constitutes the 10th aspect where the digitizer is provided with field-specific handwritten entry spaces enabling handwritten alphanumeric strings to be directly entered into corresponding designated fields of the display screen and the sizes of the handwritten free entry space and/or field-specific handwritten entry spaces can be changed independently of each other or linked with each other in accordance with a predetermined manual operation. Therefore, the handwritten free entry space and the field-specific handwritten entry spaces are effectively used differently in accordance with the primary entry/secondary entry B mode of the information. Note that it is also possible to use a single handwritten entry space as a handwritten free entry space and field-specific handwritten entry spaces in a time division manner.

More preferably, a 12th aspect of the present invention constitutes the ninth aspect wherein the alphanumeric information processing unit executes the primary entry mode of the sixth aspect, the secondary entry A mode of the seventh aspect, and the secondary entry B mode of the eighth aspect in a predetermined sequence and executes the secondary entry A mode after the end of the primary entry mode when a display field is selected for which a plurality of keywords have been extracted and executes the secondary entry B mode in other cases. Therefore, a user is guided to the next optimum entry mode in accordance with the results of the search of information of the primary entries. Not only does the entry processing become faster, but the operation is more user-friendly as well.

More preferably, a 13th aspect of the present invention constitutes the 12th aspect wherein the alphanumeric information processing unit processes the keyed in alphanumeric string from the keyboard at the time of start of execution of the secondary entry B mode or during the execution of the same when a alphanumeric entry operation is performed on the keyboard, processes the recognized alphanumeric string from the handwritten alphanumeric recognition unit in the secondary entry A mode when a handwritten alphanumeric entry operation is performed on the digitizer, and processes the recognized alphanumeric string from the speech recognition unit in the secondary entry B mode when speech is entered into the microphone.

When the secondary entry B mode is guided to by the 12th aspect of the present invention, three entry methods are possible: by keyboard, digitizer, and microphone. According to the 13th aspect of the present invention, the alphanumeric information processing unit processes the alphanumeric string entered from the unit in the secondary entry B mode by just the start of execution of any one of the entry methods, so the invention is more user-friendly.

More preferably, a 14th aspect of the present invention constitutes any of the sixth to eighth aspects of the present invention wherein further provision is made of an individual confirmation instruction unit for individually manually confirming the information of a display field in the primary entry state and the alphanumeric information processing unit designates the information of the display field as being confirmed in accordance with an instruction operation of the individual confirmation instruction unit on the selected display field. Therefore, it is possible to confirm the information of the display fields one by one.

More preferably, a 15th aspect of the present invention constitutes the 14th aspect wherein further provision is made of a display field selection control unit for sequentially selecting display fields in the primary entry state by a priority order determined corresponding to the display fields in advance.

There are, however, fields among the display fields for which confirmation of the information is urgent (for example, the case name, the time of occurrence of the case, the location of occurrence, etc.) Further, sometimes, when the information of a certain display field (location of occurrence of case etc.) is confirmed, the information of other display fields related to it (station in charge etc.) is automatically determined. Therefore, if confirming the information of the primary entries of the display fields in order, the efficiency of the entry of information is further improved. On the other hand, not only is it difficult for a user to remember such complicated dependent relationships, it is also not known when the information of a main display field in the dependent relationship was entered as a primary entry. Therefore, it was decided to establish a priority order corresponding to the display fields in advance and sequentially select the display fields in the first entry state in accordance with that priority order.

More preferably, a 16th aspect of the present invention constitutes any one of the sixth to eighth aspects wherein further provision is made of a full confirmation instruction unit for enabling manual confirmation of all of the display fields of the primary entry state all at once and the alphanumeric information processing unit designates the information of all of the display fields in the primary entry state as confirmed all at once in accordance with an instruction operation of the full confirmation instruction unit.

Note that once one is familiar with the information entry operation of the present invention, it is possible to divide the work from obtaining information on the case to a primary entry/confirmation into several stages and successively confirm a plurality of display fields smoothly starting from the important information (fast confirmation information). Further, in this case, there is a high probability of the information of the primary entries in each stage being able to be confirmed as it is. Therefore, in the present invention (16), it is made possible to manually confirm all of the display fields in the primary entry state all at once so as to enable a further improvement in the efficiency of the information entry work.

More preferably, a 17th aspect of the present invention constitutes the 14th or 16th aspect wherein the alphanumeric information processing unit has the information of the display fields in the confirmed state displayed by a second alphanumeric color different from the first alphanumeric color. Therefore, it is possible to easily distinguish the information of the display fields in the confirmed state from other information.

Further, the information entry system of an 18th aspect of the present invention is provided with a private branch exchange connected to a public network; a plurality of receiving consoles for receiving calls from general callers through the private branch exchange and each constituting a call routing system operation panel for connecting/disconnecting the exchange line system and an information entry apparatus of any of the first to ninth aspects of the present invention; a plurality of command consoles for connecting to instruction lines and/or radio lines to issue instructions to instruction receivers of related stations and/or radio units; and a local area network connecting the plurality of receiving consoles and the plurality of command consoles to enable calls to be made or monitoring to be started and stopped among any receiving consoles and any command consoles by a predetermined link control operation of the receiving console side and/or command console side, the entered information entered to and produced at an information entry apparatus being able to be shared through the calls or monitoring.

The information entry (command and control) system of the 18th aspect of the present invention makes it possible to perform the work of processing emergency calls extremely quickly and efficiently and to quickly deal with emergencies by provision of a receiving console including an information entry apparatus of any of the first to ninth aspects of the present invention. Further, by adopting a configuration enabling work to be divided between receiving consoles and command consoles and calls to be made or monitoring to be started and stopped between any receiving console and any command console, it is possible to flexibly handle the command and control work comprised of the teamwork of the processors and commanding officers. Further, by adopting a configuration enabling the entered information entered and produced at the information entry apparatus (screen information etc.) to be shared through call links or monitoring between the connected receiving consoles and command consoles, it becomes possible for a commanding officer to obtain a grasp of all of the information of the receiving consoles in real time and therefore to issue fast and accurate instructions and orders to the related stations. Further, conversely, a processor can obtain a grasp of the state of progress in execution of instructions and orders in real time and make use of this for the information entry work (work of obtaining information on cases etc.)

BRIEF DESCRIPTION OF THE DRAWINGS

The above object and features of the present invention will become more apparent from the following description of the preferred embodiments when read with reference to the accompanying drawings, in which:

FIGS. 8A and 8B are a fourth part of a flow chart of information entry processing according to an embodiment of the present invention;

FIG. 9 shows a first screen in the information entry processing according to an embodiment of the present invention;

FIGS. 10A and 10B show examples of a second screen in the information entry processing according to an embodiment of the present invention;

FIGS. 11A and 11B are first views for explaining the database according to an embodiment of the present invention;

FIGS. 12A to 12C are second views for explaining the database according to an embodiment of the present invention;

FIGS. 13A and 13B are third views for explaining the database according to an embodiment of the present invention;

FIG. 14 is a first view of the entry format of a digitizer according to an embodiment of the present invention;

FIGS. 16A and 16B are views for explaining first examples of the screen layout of a case display unit according to an embodiment of the present invention;

FIGS. 17A and 17B are views for explaining second examples of the screen layout of a case display unit according to an embodiment of the present invention;

FIG. 18 is a first view for explaining the related art; and

DESCRIPTION OF THE PREFERRED EMBODIMENTS

Figure 1:
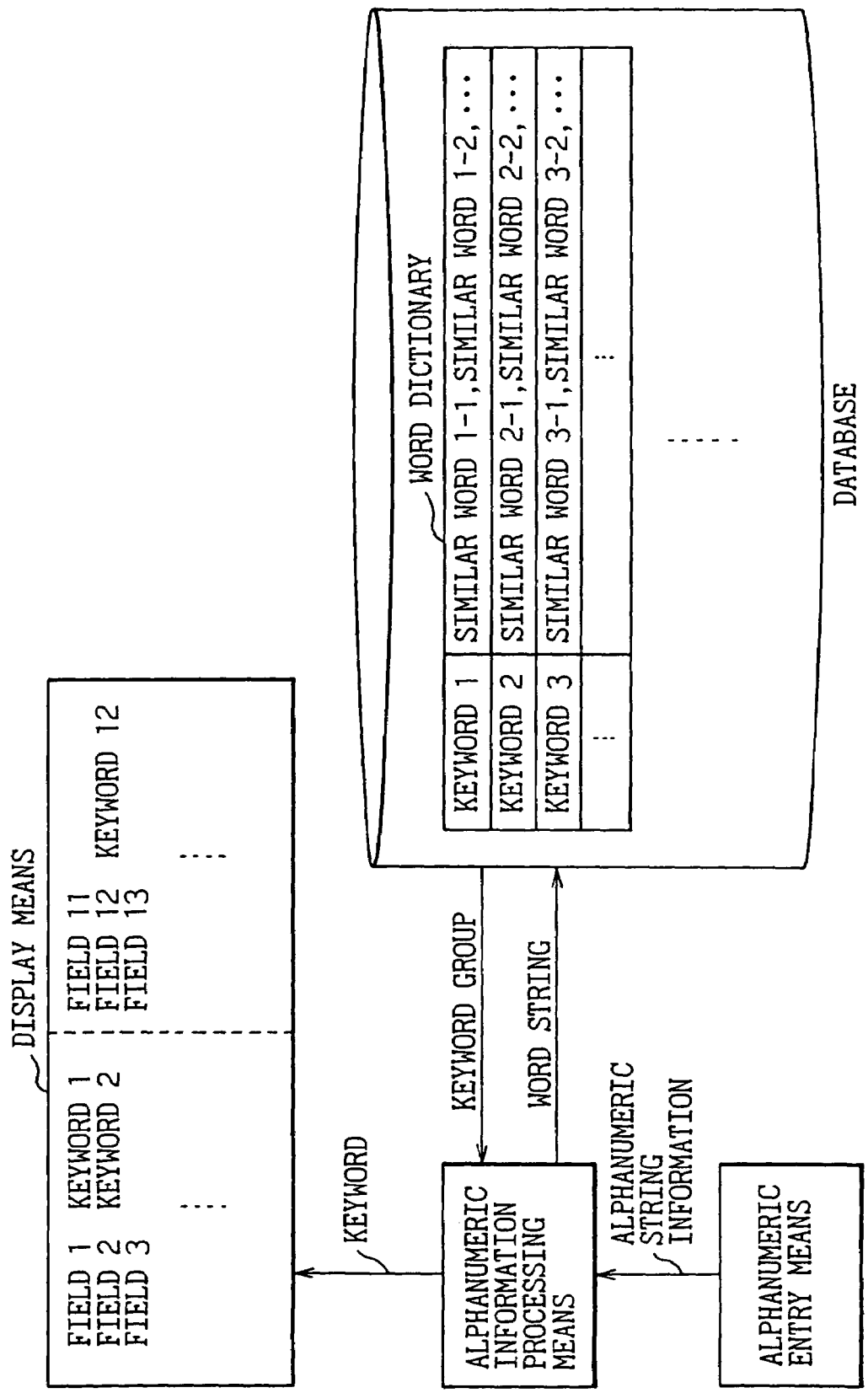
FIG. 1 is a view for explaining the principle of the present invention.

Preferred embodiments of the present invention will be explained in detail below in accordance with the attached drawings. Note that the same or corresponding parts are shown by the same reference numerals throughout the drawings.

Figure 2:
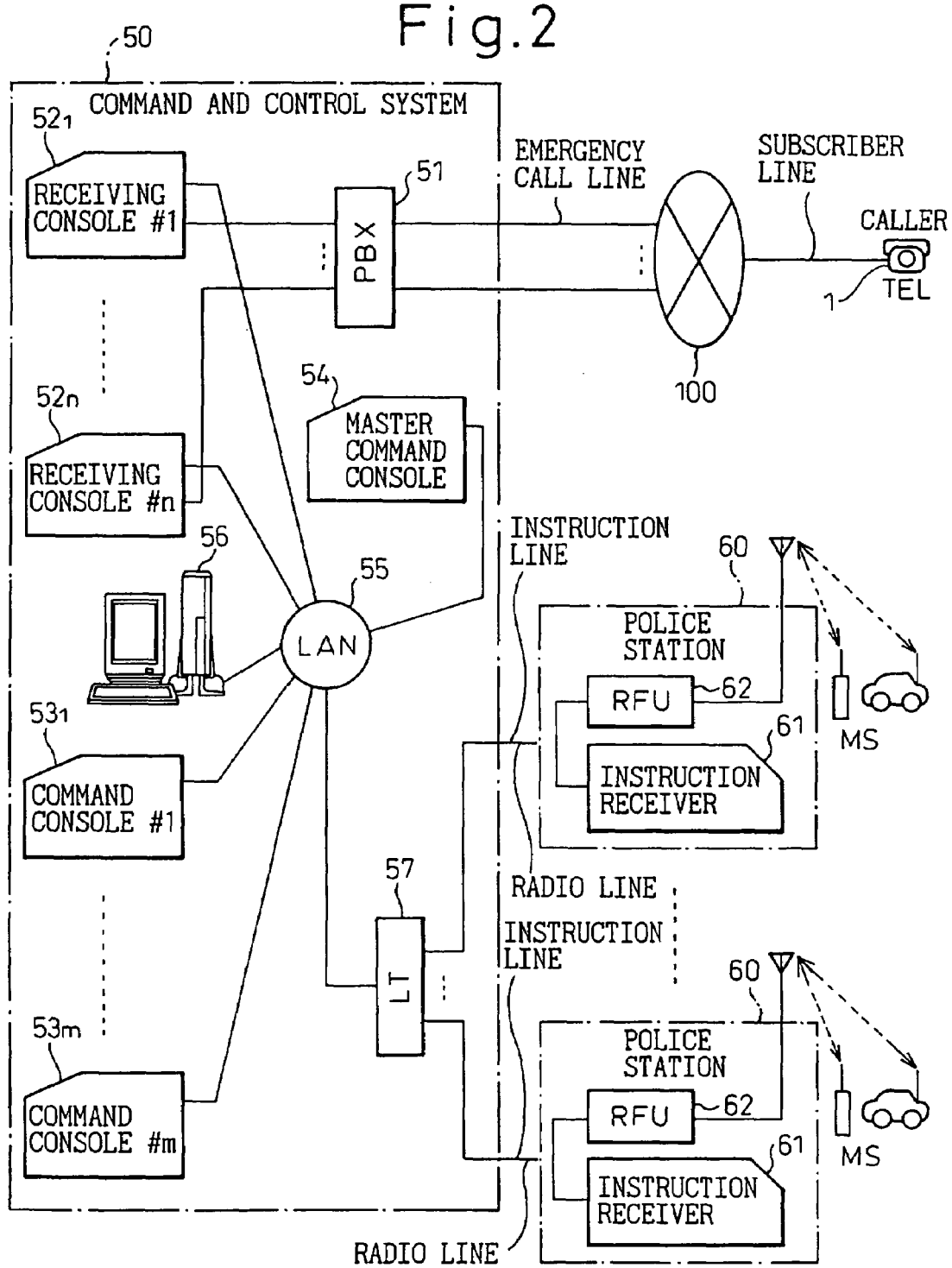
FIG. 2 is a block diagram of a command and control system according to an embodiment of the present invention.

FIG. 2 is a block diagram of a command and control system according to a first embodiment of the present invention and shows in particular the example of application of the invention to a police system. In the figure, 1 represents a telephone (TEL), 100 a public network, 50 a command and control system of the police headquarters, 51 a private branch exchange (PBX), $52_1$ to $52_n$ receiving consoles #1 to #n, $53_1$ to $53_m$ command consoles #1 to #m, 54 a master command console, 55 a local area network (LAN), 56 a server for storing and managing case information prepared at the receiving consoles etc., 57 a router (LT) incorporating instruction lines and radio lines into the LAN 55, 60 a police station, 61 a command receiving console, 62 a radio unit (RFU), and MS a mobile unit carried in a patrol car (including portable units held by police officers).

Note that the radio lines and radio units 62 may be at different locations from the police stations 60. Further, instead of providing the above router 57, it is also possible to connect the command consoles #1 to #m and the instruction lines and radio lines through the private branch exchange 51.

Due to the above configuration, emergency calls from callers are routed through the private branch exchange 15 to idle receiving consoles #1 to #n and processed by the receiving operation of the receiving consoles. The receiving party, that is, the processor, obtains the information on the case from the caller and enters the information by handwriting in a digitizer 31 etc., explained later, in the same way as taking down a memo on important information. This handwritten alphanumeric string is recognized by a handwritten alphanumeric recognition unit, predetermined word strings are extracted from the recognized alphanumeric string, the word strings obtained are used to search through a database (word dictionary etc.) all at once, and a plurality of required field information (keywords etc.) corresponding to the extracted word strings are extracted from the database and entered all at once in the corresponding display fields on the information screen. Further, if necessary, the displayed information is modified/changed and then the displayed information is confirmed by the final suitable information so as to enable the work of processing cases to be performed quickly and accurately. Further, the information on the information screen which is produced is stored in the server 56 for each case so as to be able to be reused at any time later.

On the other hand, the command consoles #1 to #m and the master command console 54 are able to suitably monitor the processing work at the receiving consoles (voice conversation between the processors and callers, displayed information of the information screen, etc.) The commanding officer mainly deals with the work of radio instructions and orders by voice etc. to the police station in charge of the case. At that time, the commanding officer can access a desired receiving console from a command console for conversation between just the commanding officer and processor or with the caller for a three-way conversation (to obtain information). Dividing the work in this way enables the number m of command consoles to be made larger than the number n of the receiving consoles. Further, the master command console 54 manages the state of execution of work at the command consoles #1 to #m (including receiving consoles #1 to #n) comprehensively.

In this embodiment, the receiving consoles #1 to #n, the command consoles #1 to #m, and the master command console 54 are connected by the local area network 55 so as to enable this divided work to be smoothly executed between separately located receiving consoles and command consoles. Shared information of the consoles can be monitored between any consoles by a call link (for calls from a receiving console to a desired command console) or monitoring (monitoring by a command console of a desired receiving console).

A "link" is an organic monitoring and teamwork function based on joint use (simultaneous monitoring) of cross-monitoring of information entry screens (information entry link: sharing of information with other consoles by display screen) and cross-monitoring of the exchange lines (exchange line link: sharing of information with other consoles by voice over the telephone). The above systems, however, are provided with independent mechanisms and functions. A link is possible by just the information entry system or just the exchange line system. Further, a link may be established between a receiving terminal provided at a receiving console and a command terminal provided at a command console by a predetermined link control operation at either console (terminal/operation panel) and the established link can be cut at any time from any console (terminal/operation panel) at the discretion of the operator (processor, commanding officer, etc.)

Further, regardless of whether a link is established or cut, the processing mode at the receiving console (operation and processing for obtaining information on case and entering that information) can be independently controlled by operation at that receiving console. For example, an operator can unrestrictedly switch to (select) a processing system (I0 mode) for continuing with just a voice line (exchange line ON) in the state with the information entry screen ended (information entry system OFF) at any time. If necessary, however, the information entry screen can be reloaded from the server 56. Further, the above processing system (I0 mode) can be unrestrictedly switched to (selected) by an operator at any time by a predetermined manual operation even in a state where a call link is established. Further, an entry system (I1 mode) for simultaneous entry of information into a plurality of fields as usual with the information entry system ON and the exchange line system OFF can be switched to (selected) by an operator at any time. Further, this entry system (I1 mode) can be switched to (selected) by an operator at any time by a predetermined manual operation even in a state where a call link is established.

Figure 3:
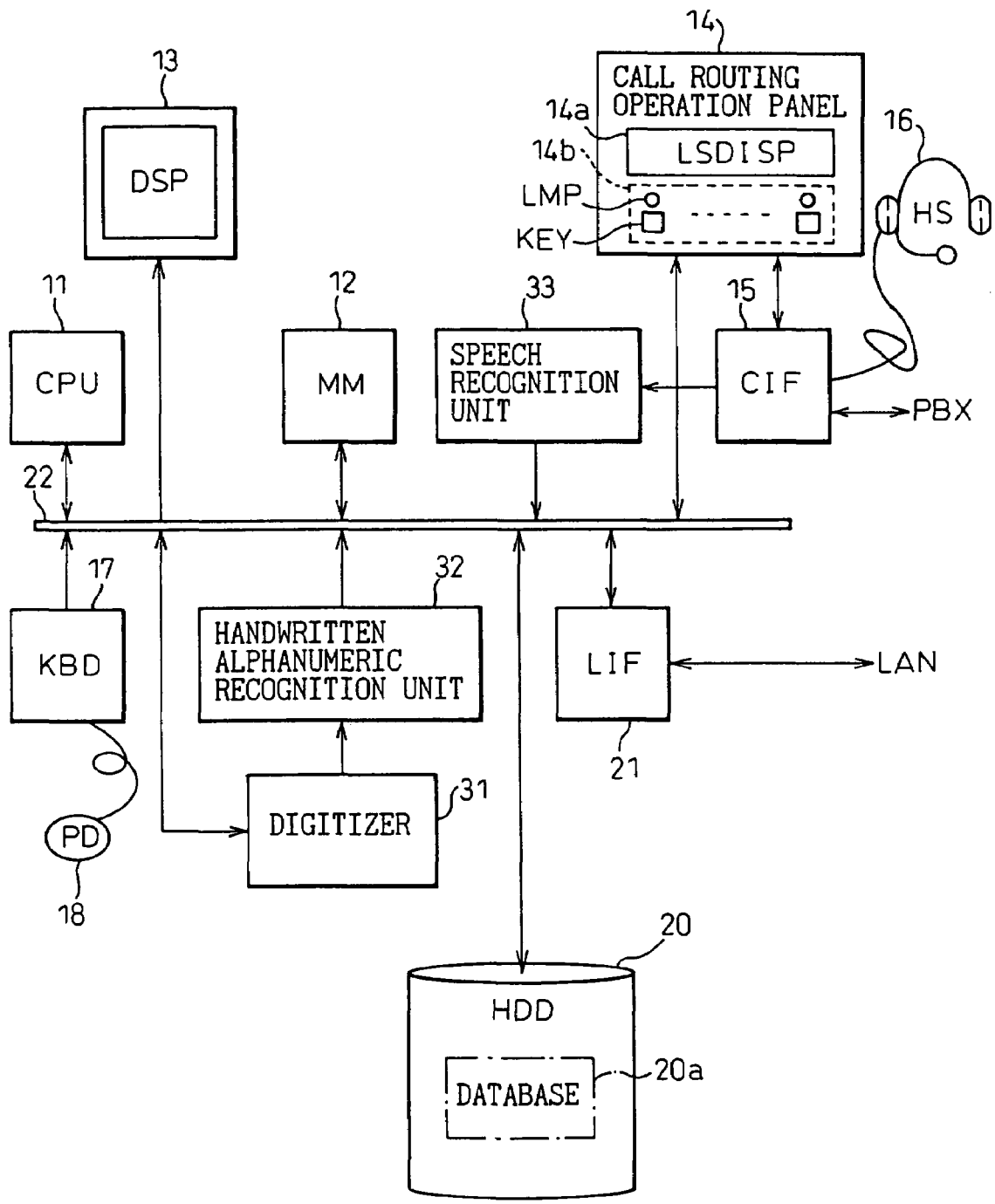
FIG. 3 is a block diagram of a receiving console according to an embodiment of the present invention.

FIG. 3 is a block diagram of a receiving console according to an embodiment of the present invention. In the figure, 11 represents a CPU for main control and processing (including the alphanumeric information processing of the present invention) of the receiving console, 12 a main memory (MM) for storing programs and information used by the CPU 11, 13 a case display unit (DSP) using a cathode ray tube (CRT), plasma display, liquid crystal display (LCD), etc., 14 a call routing operation panel for manual control of the exchange lines, 15 a circuit interface (CIF) for connecting with a private branch exchange 51, 16 a headset (HS) for use by a processor, 17 a keyboard (KBD), 18 a pointing device (PD) comprised of a mouse (or plasma touch panel etc.), 20 a hard disk drive (HDD) for use as a secondary storage device for storing program files or information files (including the later explained database 20a) for use by the CPU 11, 21 a LAN interface (LIF) for connection to the local area network 55, 22 a common bus of the CPU 11, 31 a digitizer for entry of handwritten alphanumerics or symbols etc., 32 a handwritten alphanumeric recognition unit for recognizing handwritten alphanumerics or symbols etc. entered to the digitizer, and 33 a speech recognition unit for recognizing the speech of the caller or processor.

Further, in the call routing operation panel 14, 14a is a line status display unit (LSDISP) for displaying the status (idle, receiving, busy, hold, etc.) of the lines (emergency call lines, instruction lines, radio lines) and 14b an operation unit for displaying the incoming emergency calls and call response operation (pushbutton operation). The operation unit 14b has an array of a plurality of display lamps (LMP) and operating buttons (KEY). Several of the keys are provided paired with lamps (LMP). The lamps turn on to prompt quick operation of the keys.

In addition, while not shown, further provision is made of a map display unit for displaying a map, a tape deck for recording the conversation between a processor and a caller, a monitor speaker for outputting a radio call from a radio vehicle (patrol cars etc.) as it occurs, etc.

Figure 4:
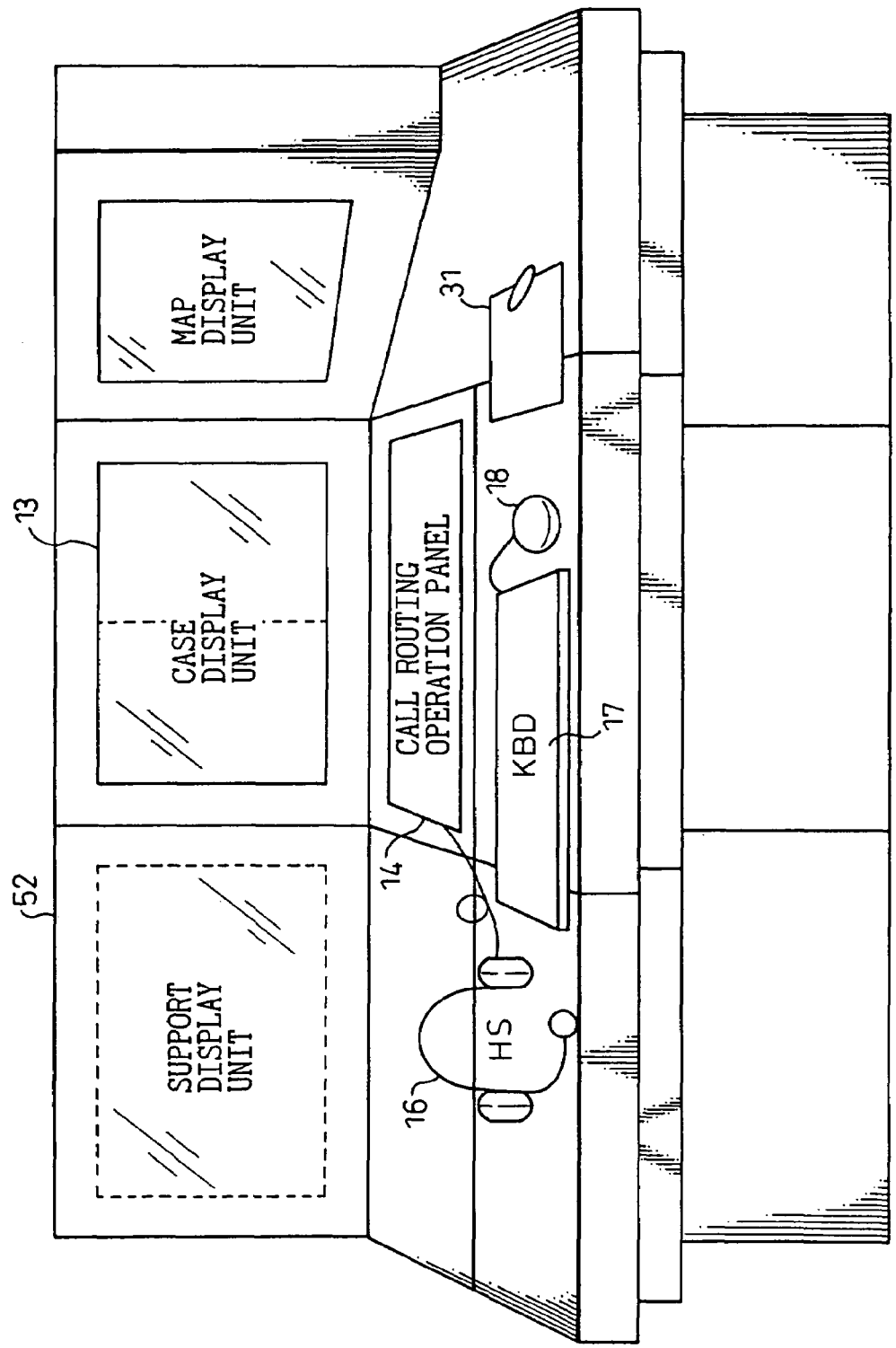
FIG. 4 is a view of the appearance of a receiving console according to an embodiment of the present invention.

FIG. 4 is a view of the appearance of a receiving console according to an embodiment of the present invention. At the front of the receiving console 54 are arranged a case display unit 13, a support display unit to its left, and a map display unit at an angle to its right. The case display unit 13 is divided into a left screen and a right screen. Basically, the left screen displays basic case information such as the "case name", "time of occurrence", and "location of occurrence". The right screen automatically displays detailed information relating to the content of the "case name". On the other hand, the map display unit displays map information relating to the "location of occurrence" of the case to make it easier for the processor to obtain a specific grasp of the location of occurrence of the case and the dispatched destinations of patrol cars etc. The support display unit is provided in accordance with need.

Further, the receiving console 52 has a desk part on which are arranged a call routing system operation panel 14, a keyboard 17, a pointing device 18, and a digitizer 31. The receiving console operator sits down and puts on the headset 16 to receive (process) emergency calls. Note that while not shown, the command console 53 is configured similar to the receiving console 52 in appearance. Its functions may be similar to the functions of a receiving console 52 except for the function of receiving calls over the telephone lines.

FIGS. 16A and 16B and FIGS. 17A and 17B are views for explaining the screen layout of the case display unit 13 of an embodiment of the present invention. FIG. 16A shows the display layout of the case (basic) entry screen. As explained above, this basic entry screen is displayed at the left side of the case display unit 13. Common, basic information (plurality of fields) is displayed for all types of cases here. Here, "receipt no." shows the serial number of the case processed, "line name" shows the name of the line receiving the emergency call, "receipt time" shows the time the emergency call was received, "processor" shows the name and ID number of the processor registered at the receiving console in advance, and "end time" shows the time the emergency call ended. This information is already known and automatically obtained by the system. The information is automatically displayed in the fields.

Further, "case name 1" shows the name of the case automatically processed (extracted) based on the call information at the time of receiving and processing the case, "case name 2" shows the formal name of the case determined based on the police officer s or other party s grasp of the situation when rushing to the scene after a case has been processed (case name 2 given priority in actual work), "station in charge" shows the name of the station in charge of the location where the case occurred, "time of occurrence" shows the reported time the case occurred, and "location of occurrence" shows the reported address, name, etc. of the location where the case occurred. The information is preferably entered into the digitizer 31 by the processor by handwriting by a free format. The later explained database 20a is searched through by the recognized alphanumeric string and the information of the plurality of fields hit is provisionally displayed in the corresponding fields (primary entry).

Note that the information in the field shown by "case name 1" (keywords to be used in work) includes "murder", "burglary", "theft", "kidnaping", "pickpocketing", "battery", "rape", "assault", "traffic accident", "personal injury", "property damage", "hit and run involving person", "hit and run involving property", "telephone office test", "fixed office test", "experiment", "test", "wrong connection", "no response", "prank call", "fire department", "fire", "arson", "other inquiries", "transfer of case", "transfer to other prefecture", etc. Further, while not shown, the "commanded unit" field shows "AAA station", "BBB station", "CCC station", "mobile investigation squad", "MI group", "investigation department", "investigation AAA department", "public safety department", "traffic control department", "fire center", "AAA prefectural police", etc. as keywords.

Next, the information in each field can be replaced, modified, or confirmed by operation by the mouse 18 etc. to select information from a list of candidates for replacement (secondary entry A mode), by direct entry of alphanumeric information by the keyboard 17 (secondary entry B key mode), or by entry of a voice signal by a microphone (secondary entry B voice mode).

When the information of the above "case name 1" is provisionally entered (or confirmed), the right side of the case display unit 13 automatically displays the information entry screen for entering detailed information corresponding to the information of "case name 1" linked with it. There are for example eight information entry screens available for the information of "case name 1", that is, for "penal offense (1)", "kidnaping (2)", "hit and run (3)", "traffic accident (4)", "traffic violation (5)", "protection and rescue (6)", "accident and disaster (7)", and "other (8)".

FIG. 16B shows the information entry screen for "penal offense (1)", while FIG. 17A shows the screen for "traffic accident (4)". In the penal offense screen of FIG. 16B, the processor enters the information obtained into the digitizer 31 by handwriting preferably in the same way as above for the "direction of flight", "means of flight", etc. of the suspect and other indeterminate information. The database 20a is searched through by the recognized alphanumeric string and the information of the plurality of fields hit is provisionally displayed all together in the corresponding fields (primary entry). Further, if necessary, the information of the remaining fields (fields not filled by primary entry) may be directly entered by keying it in by the keyboard 17, handwritten entry by the digitizer 31, or voice entry by the microphone. The same applies to the traffic accident screen of FIG. 17A.

Further, FIG. 17B shows the processing result entry screen. For example, the "result of processing" field shows "custody", "arrest", "time elapsed", "ongoing investigation", or "transfer to another station" as keywords. Further, while not shown, the "other" field shows "emergency deployment", "ED", "important case", "important", "questioning", "station deployment", "wide area deployment", "adjoining deployment", "priority alert", etc. as keywords.

Figure 15:
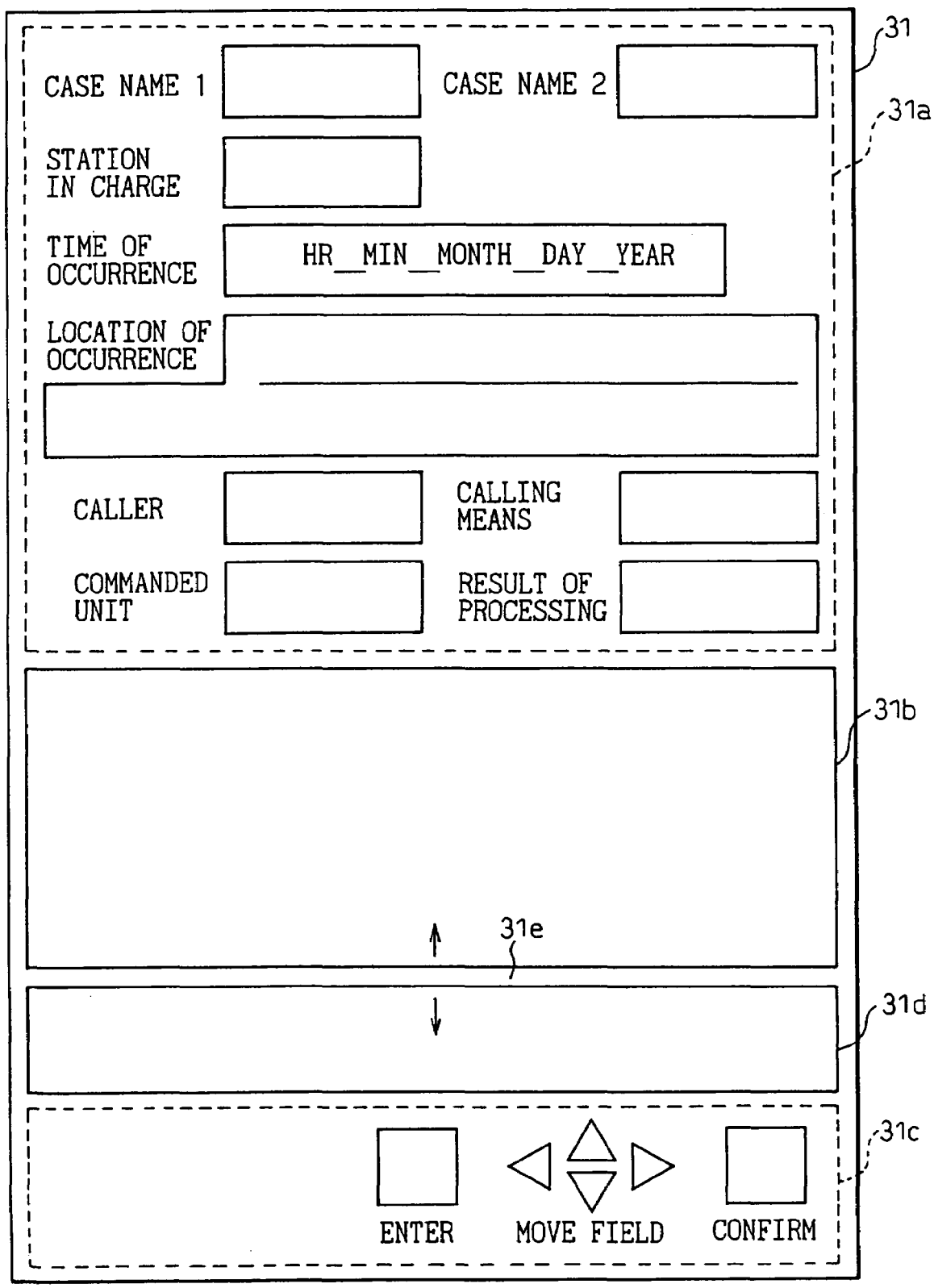
FIG. 15 is a second view of the entry format of a digitizer according to an embodiment of the present invention.
Figure 19:
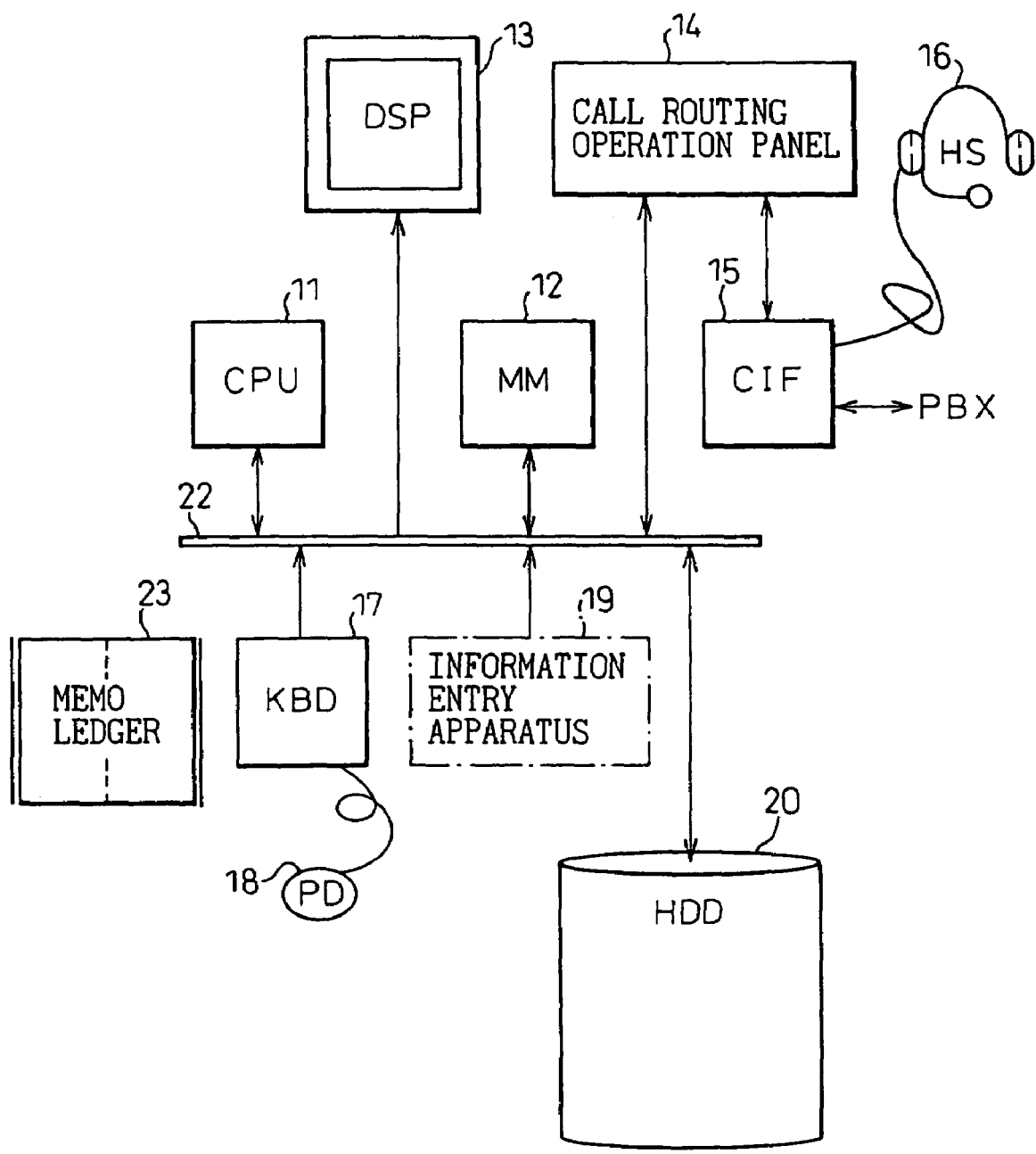
FIG. 19 is a second view for explaining the related art.

FIG. 14 and FIG. 15 are views of the entry format of the digitizer according to an embodiment of the present invention. FIG. 14 is a frontal view of an example of the digitizer 31. The digitizer 31 outputs corresponding position coordinate information (x,y) when touched by a pen at any location on its screen. The pen can be dragged in contact with the screen to enter stroke information of handwritten alphanumerics and symbols.

Such a digitizer 31 may be constructed by a coordinate detection sheet (electrode sheet) for detecting the touch of a pen and a transparent sheet on which the illustrated format is printed in advance laid over the same or by a liquid crystal or plasma display board and a transparent coordination detection sheet laid over the same. In the former case, it is necessary to change the printed sheet when changing the entry format, but the digitizer can be constructed at a low cost. Further, according to the present invention, since it is possible to enter information of a plurality of different fields using the later explained handwritten free entry space 31b, there is no need to prepare several types of printed sheets. On the other hand, in the latter case, while somewhat higher in cost, it is possible to freely change the entry format in accordance with the state of progress in information entry processing—making the digitizer more user friendly.

The handwritten entry space of the digitizer 31 according to this embodiment may be a single entry space with an entire area of a handwritten free format or as illustrated may be divided into a plurality of types of handwritten entry spaces according to the purpose of use. In this example, it is divided into a fixed entry space 31a for entry in basic fields common to all cases ("case name 1" to "result of processing" etc.), a handwritten free entry space 31b enabling a processor to enter information obtained etc. by handwriting by a free format, and a control entry space 31c for entry of control codes relating to entry of information and control of the cursor on the display screen.

The entry fields of the fixed entry space 31a are partially provided in a one-to-one correspondence with the display fields of the case (basic) entry screen. Here, it is possible to enter by handwriting important information such as that required for quick confirmation and calling the relevant station when processing a case ("case name 1" to "location of occurrence" etc.) in the corresponding fields (at this time, it is also possible to refer to the database 20a for finding keywords). Further, if the processor enters by handwriting the entire information obtained by a free format in the handwritten free entry space 31b instead of the above fixed entry space 31a, the database 20a is searched through by the recognized alphanumeric string and the information of the plurality of fields hit (keywords) are provisionally displayed (primary entry) all at once in the corresponding fields of the display screen.

Further, the control entry space 31c is provided with a touch entry area "enter" (corresponding to enter key of keyboard) for control of the end of entry of one paragraph's (one sentence's) worth of an alphanumeric string in the handwritten entry of the above free format, a touch entry area "move field" (corresponding to cursor movement keys of keyboard) for changing the designated field on the display screen (cursor position etc.), and a touch entry area "confirm" for confirming the primary entry information on the display screen for each designated field. In addition, while not shown, it is possible to provide a touch entry field "confirm all" for confirming the primary (provisional) entry information of a plurality of fields on the display screen all at once. In each of the touch entry areas, by just touching an area by a pen, the CPU 11 detects the entry coordinates (x,y) and executes the corresponding control function.

FIG. 15 is a front view of another example of a digitizer 31 and shows the case of a combination of a transparent coordinate detection sheet and a back liquid crystal or plasma display board. Here, further provision is made of a field-specific handwritten entry space 31d enabling direct entry of a recognized alphanumeric string of handwritten alphanumerics in a designated (selected) field of the display screen. Note that the database 20a may also be searched through by the recognized alphanumeric string of alphanumerics written in the field-specific handwritten entry space 31d and the related hit information (keyword etc.) may be entered into the corresponding display field. If this processing is performed, it is possible to enter accurate information (keyword) in the corresponding display field even by simplified handwritten entry.

Further, a control bar area 31e for changing the areas occupied by the above free entry space 31b and the field-specific handwritten entry space 31d is provided between the two entry spaces 31b, 31d. When the user touches the control bar area 31e by a pen, the CPU 11 recognizes that the control bar area 31e has been touched by a pen based on the coordinate information (x1,y1). When the user then drags the pen upward or downward in direction, the CPU 11 detects the coordinates (x2,y2) of the position to which it was dragged. When the user lifts the pen off the area, the CPU 11 changes the position of the control area 31e (that is, the ratio of the areas occupied by the two entry spaces 31b, 31d) to the coordinates (x2,y2) of the position to which the pen was dragged.

Therefore, when a relatively large handwritten free entry space 31b is required when obtaining information at the start of processing of a case etc., the processor lowers the control bar area 31e to enable entry of a lot of handwritten alphanumerics (memo) in the thus enlarged handwritten free entry space 31b. After this, when a relatively large field-specific handwritten entry space 31d is required when entering detailed information in a corresponding field, the processor raises the control bar area 31e to enable entry of a lot of handwritten alphanumerics (memo) in the thus enlarged field-specific handwritten entry space 31d. Therefore, the limited entry space of the digitizer 31 can be effectively used. The rest of the functions and configuration may be similar to those explained with reference to the above FIG. 14.

FIGS. 11A and 11B, 12A to 12C, and 13A and 13B are views for explaining the database according to an embodiment of the present invention. The database 20a includes a plurality of types of tables (dictionaries) such as explained below. One or more of the tables are referred to all at once in accordance with the stage of the information entry processing.

FIG. 11A shows a table (word dictionary) relating to the "case name". The table is referred to all at once at the time of primary (provisional) entry of information into a plurality of fields of the information screen by handwritten alphanumeric entry to the handwritten free entry space 31b for example. The first column of the case name table lists keywords allowed as information to be displayed for the "case name 1" (that is, "theft", "extortion", . . . , "smell", and other words relating to the command and control work). Further, the second columns on list one or more similar words (synonyms, idioms, slang, etc.) which easily bring to mind the keywords in correspondence to the keywords. Therefore, for example, if there is the recognized alphanumeric string "breaking and entering" in the handwritten entered sentence (cut out words), a hit is finally obtained by the similar words "breaking and entering" in the case name table, whereupon the keyword "theft" of the case name is extracted and "theft" is provisionally entered in the display field of the case name. The same applies when entering by handwriting the keyword "theft" itself or the similar words "pickpocketing" or "rob".

If there is the recognized alphanumeric string "collapsed" in the handwritten entry sentence, a hit is finally obtained similar word "collapsed" listed two times in the case name table. In the case, the two keywords "sick person" and "injured person" are extracted as the case name 1. One of these (for example, "sick person") is provisionally entered in the display field of the case name 1 and the other ("injured person") becomes a candidate of the selection options (secondary entry A) in the window display field displayed near the case name 1.

FIG. 11B shows a table relating to the "location of occurrence" (address dictionary). This table is also referred to all at once at the time of primary entry of information into a plurality of fields of the information screen due to handwritten alphanumeric entry to the handwritten free entry space 31b for example. The address information is specified by the address and the name or short name (generally used name) of the building or store. For example, if there is the recognized alphanumeric string "BBB Post Office" in the handwritten entry sentence, a hit is finally obtained by the name "BBB Post Office" of part of the address information in the location of occurrence table and the full address information "BBB Post Office, 123 AAA St., BBB city" is provisionally entered in the display field of the location of occurrence of the screen.

Further, when there is the recognized alphanumeric string "AAA St., BBB city" in the handwritten entry sentence, hits are finally obtained by the address part "AAA St., BBB city" of parts of address information of the location of occurrence table. In this case, two locations of occurrence (keywords), that is, "BBB Post Office, 123 AAA St., BBB city" and "AAA Bank, DDD Branch, 3525 AAA St., BBB city", due to the address part "AAA St., BBB city" are extracted. One of these (for example, "BBB Post Office, 123 AAA St., BBB city") is provisionally entered into the display field for the location of occurrence, while the other ("AAA Bank, DDD Branch, 3525 AAA St., BBB city") becomes a candidate for selection option (secondary entry A) in the window display field displayed near the display field of the location of occurrence. The same may be considered to be true in other cases as well. Note that the recognized alphanumeric strings "BBB Post Office", "AAA St., BBB city", etc. include the alphanumerics for "Post Office", "City", "St.", etc. closely related to expressions of addresses, so highly probably indicate the location of occurrence of a case, so the location of occurrence table may be referred to first.

FIG. 12A shows the table related to the "time of occurrence". This table is also referred to all at once at the time of primary entry of information into a plurality of fields of the information screen due to handwritten alphanumeric entry to the handwritten free entry space 31b for example. The information of the time of occurrence is specified by the month, day, year, hour, and minute. For example, when there is the recognized alphanumeric string "AA/BB CC:DD" in the handwritten entry sentence, a hit is finally obtained with the entry format "MM/DD hh:mm" (where MM, DD, hh, and mm mean any numerals including spaces) of the month, day, hour, and minute of the time of occurrence table and "AA/BB/99 CC:DD" is provisionally entered into the display field of the time of occurrence. Here, 99 is the year 1999 of the default entry (current year).

Further, when there is the recognized alphanumeric string "CC:DD" in the handwritten entry sentence, a hit is finally obtained with the entry format "hh:mm" of the time of the time of occurrence table and "08/23/98 CC:DD" is provisionally entered in the display field of the time of occurrence. Here, August 23 is the default entry date (current day). The same may be considered to be true in other cases as well. Note that the recognized alphanumeric strings "AA/BB CC:DD", "CC:DD", etc. include the symbols "/", ":", etc. sandwiched between numerals, which are closely related to expressions of time, so have a high possibility of expressing the time of occurrence of the case. Therefore, the time of occurrence table may be referred to first.

FIG. 12B shows a table relating to the "station in charge". The table is automatically referred to after primary entry of the location of occurrence by the handwritten alphanumeric entry or after confirmation of the same at the time of primary entry of information in a display field (station in charge) related to the location of occurrence. The station in charge can be determined directly when the location of occurrence has been determined. For example, when the display field of the location of occurrence contains the information "111 AAA St., BBB city", "222 AAA St., BBB city", or "333 AAA St., BBB city", the "AAA Station" in charge of those areas is provisionally entered into the display field of the station in charge. Note that it is also possible to design the system so that for example the keyword of "mobile investigation squad", a concept beyond a station based on location, is provisionally entered in accordance with the primary entry information of the "case name 1" other than the above location of occurrence.

FIG. 12C shows a table relating to "gender". This table is also referred to all at once at the time of primary entry of information into a plurality of fields of the detailed information screen due to handwritten alphanumeric entry. The keywords in the gender column include "male", "female", and "unknown". For example, when there is the recognized alphanumeric string "transvestite" in the handwritten entry sentence, a hit is obtained by the similar word "transvestite" in the gender table and "male" is provisionally entered into the display field for the gender. The same may be considered to be true for other cases as well. Note that when there is the recognized alphanumeric string "gender unknown" in the handwritten entry sentence, "unknown" is provisionally entered into the display field for the gender so as to clearly differentiate this from when there is merely no gender information (no information entered).

FIG. 13A shows a table relating to the "perpetrator type". The memory structure and method of use of the table may be considered the same as those of the case name table explained with reference to FIG. 11A.

FIG. 13B shows a table of the "form dictionary". The dictionary is automatically referred to at the time of automatic selection processing of the detailed information entry screen closely related to the information in the display field of "case name 1" after primary entry of the above "case name 1" by handwritten alphanumeric entry or after confirmation of the same. The first column of the form dictionary lists the form information (form numbers) for primary entry of detailed information relating to "case name 1" of the left half of the screen at the right half of the case display unit 13. Here, the case information is divided into eight large groups, that is, penal offenses (1), kidnaping (2), hit and run cases (3), traffic accidents (4), traffic violations (5), protection and rescue (6), accidents and disasters (7), and others (8), and display formats established for each. Here, (1), (2) . . . indicate the form numbers. Further, the second and other columns of the form dictionary list the information (keywords) of the case name 1 (or case name 2) corresponding to the display forms.

Note that the above explanation related to the case of handwritten entry of an alphanumeric string from the handwritten free entry space of the digitizer 31, but it is also possible to enter the alphanumeric string (sentence) from a keyboard 17 instead of the digitizer 31. In this case as well, by searching through the database 20*a* by the keyed in alphanumeric string, a plurality of keywords can be hit at one time and can be provisionally entered (or directly entered and confirmed) all at once in the plurality of corresponding display fields. The processor in this case need only straightforwardly key in the information obtained by the same level of simplicity (rough sentences) as when writing a memo in the handwritten free entry space 31*b*, so no skill is required for the key entry. Further, information of the same extent as a memo may be entered by voice entry from a microphone.

FIGS. 5 to 8 are parts of a flow chart of the information entry processing according to an embodiment of the present invention. Further, FIG. 9 and FIG. 10 are views of screens in the information entry processing according to an embodiment of the present invention. The information entry processing according to this embodiment will be explained in detail below with reference to the drawings.

Figure 5:
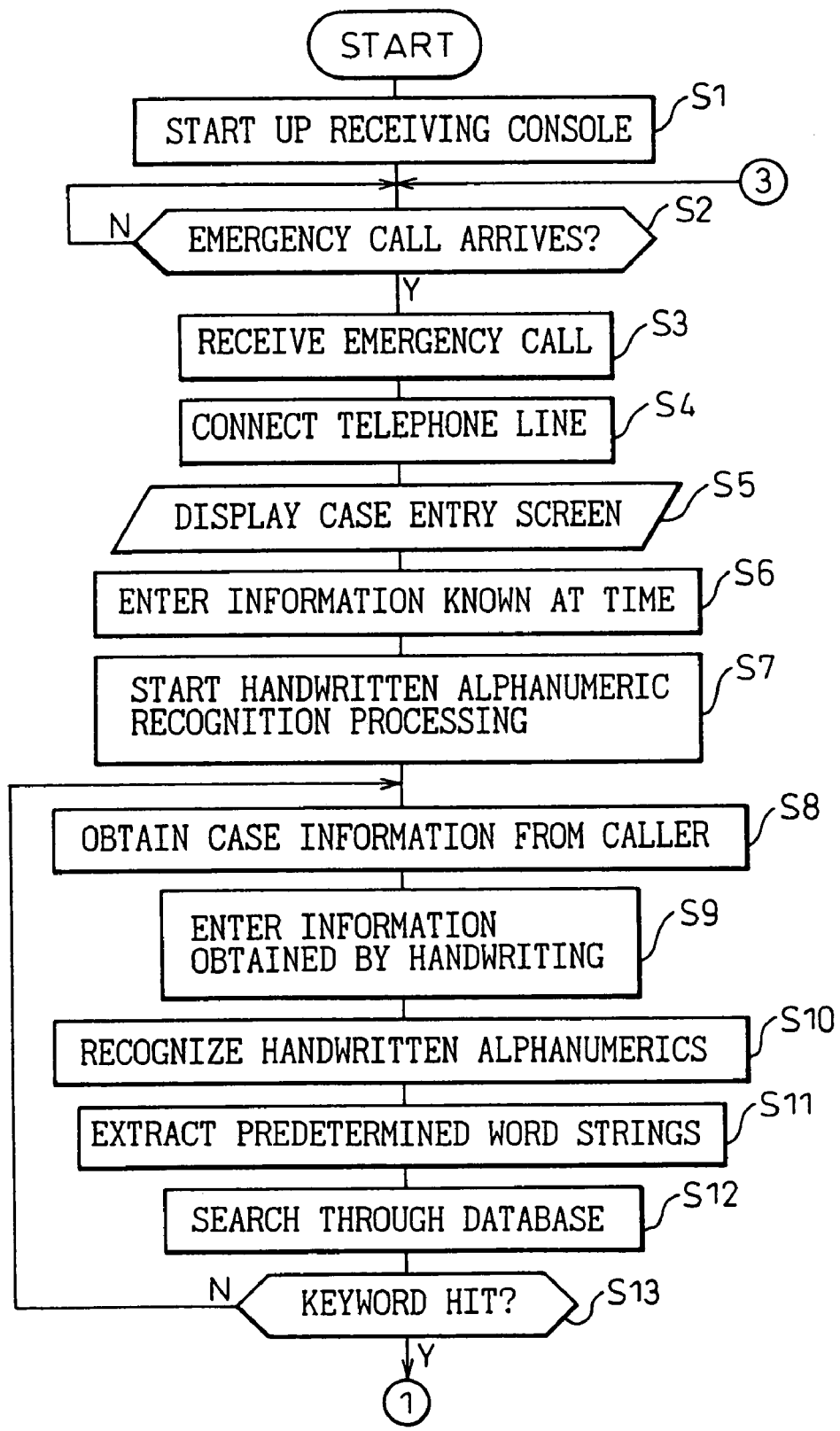
FIG. 5 is a first part of a flow chart of information entry processing according to an embodiment of the present invention.

In FIG. 5, at step S1, the processor starts up the receiving console 52 (registers processor ID at receiving console, inserts recording tape, etc.) At step S2, he waits for an incoming emergency call. When an emergency call comes in, at step S3, the processor performs the operation for receiving the emergency call at the call routing operation panel 14 (pushes the receiving key). Due to this, at step S4, the incoming call from the private branch exchange 51 is connected to the circuit interface 15. Further, linked with the receiving operation, at step S5, the case entry screen (basic screen) of FIG. 16A is automatically displayed at the left half of the case display unit 13. Further, at step S6, the information of the display fields known at that time (receipt number, line name, receipt time, etc.) are automatically entered (displayed) on the basic screen. This entry may be confirmed entry. Further, at step S7, linked with the above receipt operation, in this example, the following handwritten alphanumeric recognition processing using the digitizer 31 is started (the handwritten free entry space 31*b* is activated). Note that it is also possible to design the system so that the digitizer entry is activated by the processor performing an operation to select digitizer entry.

At step S8, the processor obtains information of the case from the caller. At step S9, he enters a memo of the information obtained by handwriting at the handwritten free entry space 31*b* of the digitizer 31. At step S10, the handwritten alphanumeric recognition unit 32 recognizes the handwritten alphanumeric string (including symbols). Finally, when the punctuation code for one paragraph's (one sentence's) worth of information is entered, at step S11, predetermined word strings (keywords of above tables, similar words for extracting the keywords, partial words sufficient for generating the location of occurrence and time of occurrence, etc.) are extracted from the recognized alphanumeric string by the CPU 11.

Here, the above sentence punctuation mark is for example produced when the punctuation mark "." for one sentence (one paragraph) or the left bracket "]" is handwritten and recognized. Further, it is possible to touch a pen to the control area "enter" in the touch entry space 31*c* of the digitizer 31. Alternatively, it is possible to not wait for entry of such a punctuation mark, but to perform the processing for cutting out predetermined words and searching through the database 20*a* in parallel with the entry of the alphanumerics.

At step S12, the extracted one or more word strings are used to search through the database 20 all at once. At this time, it is possible to search through all tables by each extracted word, but for example by searching through just the time of occurrence table for words comprised of numerals connected by the "/" or ":" mark, closely tied to time in practice, such as "AA/BB" or "CC:DD" or through just the location of occurrence table for words comprised of numerals and the letters "St." (closely tied to addresses in practice) such as "123 AAA St.", the search processing can be speeded up. Note that as an example of the information obtained at the start of a call, there is:

Processor: "This is the police emergency line. What happened?"

Caller: "My god . . . help! I am calling from the bar. Come quickly." (≈information of handwritten memo).

At step S13, it is judged if at least one keyword (predetermined alphanumeric string able to be displayed in display field) has been hit for the handwritten memo entry of the information obtained. In the above example, there is no hit, so the routine returns to step S8 where the above processing is repeated. Note that the next information obtained in this example is as follows:

Processor: "Calm down. What happened where?"

Caller: "uh . . . this is the Bar Heavy Drink, two gangsters are smashing up the place. Come quickly!"

FIG. 9 shows the handwritten memo at that time. Here, however, an explanation will be given of the case where the fixed entry space 31*a* is not used, but the entire information obtained is entered by handwriting in the free entry space 31*b*. Note that the "22:30", in the handwritten memo indicates the time of occurrence of the case as learned by additional questioning.

Returning to FIG. 5, the words "bar", "heavy drink", "two", "gangsters", "smashing", "22:30", and other predetermined words are extracted from the handwritten memo. The words are extracted by for example searching through the database 20*a* all at once by a series of recognized alphanumeric strings and successively cutting out alphanumeric strings for which matches are obtained by comparison with part of all of keywords, similar words, and other format information etc. At step S12, the database 20*a* is searched through all at once by the extracted words. Further, at step S13, since a hit was obtained for at least one keyword (in this case, six keywords), the processing proceeds to FIG. 6.

Figure 6:
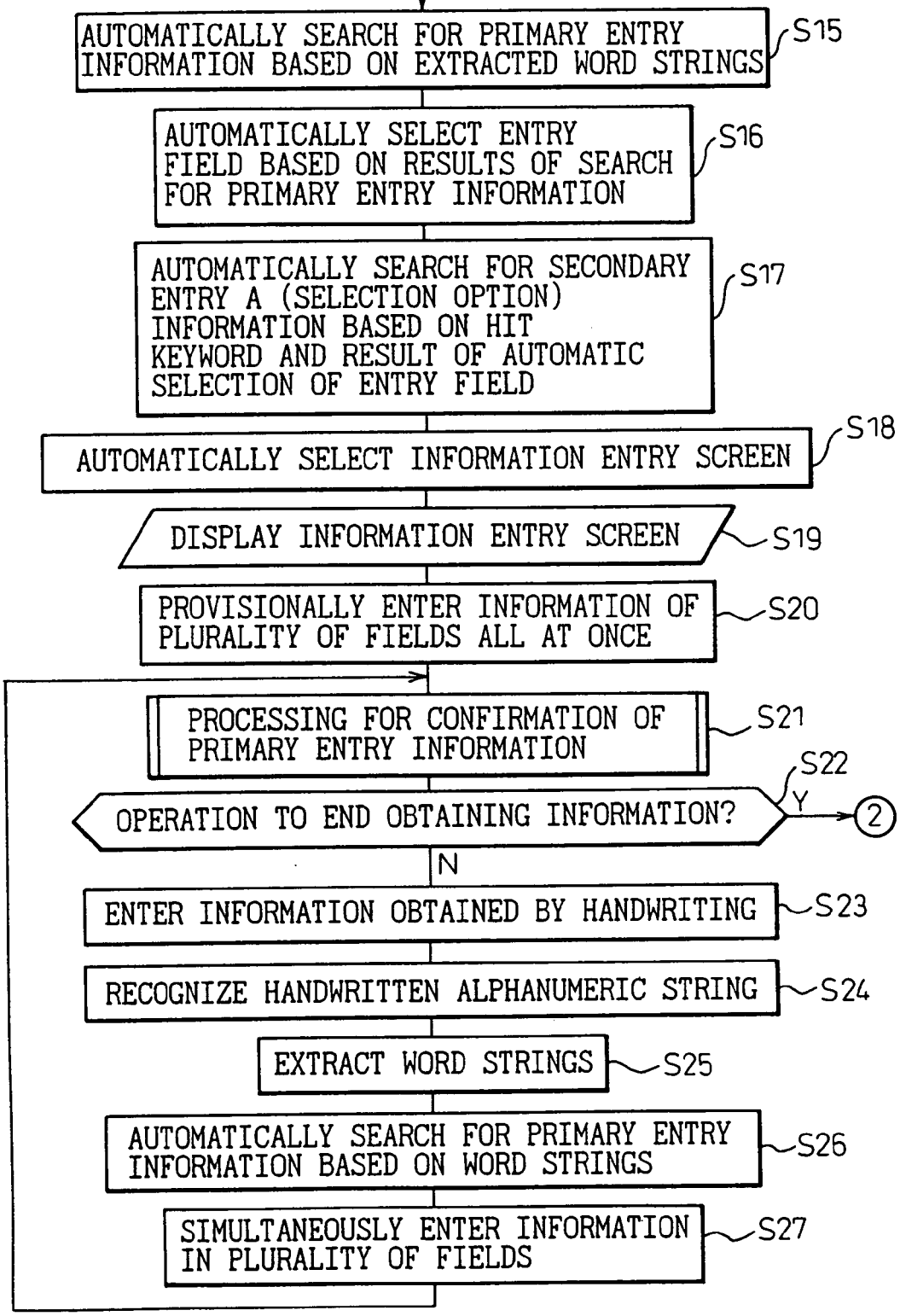
FIG. 6 is a second part of a flow chart of information entry processing according to an embodiment of the present invention.

In FIG. 6, at step S5, an automatic search is conducted of the primary entry information (hit keywords) based on the extracted word strings. At step S16, the screen entry fields are automatically selected based on the results of the search of the primary entry information. At step S17, an automatic search is conducted of the secondary entry A (display of list of selection options) information based on the hit keywords and the results of selection of the entry fields. In this case, if several keywords have been extracted for one display field, consideration is given to the relevance with the handwritten memo information of other parts and the hit keywords of other fields and the keyword with the highest relevance and compatibility with the display field is made the primary (provisional) entry and the other keywords are made candidates for secondary entry A information (candidates of list of selection options) in the order of priority (relevance and compatibility).

At step S18, the form dictionary of FIG. 13B is referred to based on the results of the search of the primary entry information of the "case name 1" and the information entry screen (detailed screen) is automatically selected for display at the right half of the case display unit 13. At step S19, the selected information entry screen is displayed at the right half of the case display unit 13. At step S20, the extracted information of the plurality of fields is provisionally entered all at once in the corresponding display fields of the basic screen and the information entry screen. Note that the primary entry information is displayed for example by the yellow color here.

FIG. 10A shows an example of the display at the case entry screen. The information for the "receipt no." to "processor" is automatically entered (confirmed entry also possible) by the information known up to that point of time. The "end time" is still not determined (blank) while the caller is being talked with. "Case name 1" has provisionally entered in it the case name keyword "property damage" (not shown in the table) as a result of a hit with the word "smashed" in the handwritten memo in the case name table of FIG. 11A. Further, the simultaneously hit other keyword "extortion" has low relevance with the other word "bar" in the handwritten memo of FIG. 9, so becomes a candidate on the list of the secondary entry A (window display of "extortion"). The "time of occurrence" has provisionally entered in it the keyword of the time of occurrence "8/23/99 22:30" as a result of a hit of the word "22:30" in the handwritten memo in the time of occurrence table of FIG. 12A. Further, the "location of occurrence" has provisionally entered in it the keyword of the location of occurrence "Bar Heavy Drink, 235 CCC St., BBB city" as a result of the hit of the words "bar" and "heavy drink" in the handwritten memo in the location of occurrence table of FIG. 11B. Further, in this example, consideration is given to a possible mistake in hearing, mistake in writing, etc. of the processor and, as a result, the keyword of another similar name is extracted from the location of occurrence table. Here, "Bar Heavy Drinkers, 5215 DDD St., EEE city" becomes a candidate of the list of the second entry A. Further, "AAA Station" is automatically provisionally entered in the field of "station in charge" based on the primary entry information of the "location of occurrence". An important field such as the "location of occurrence", however, may also be provisionally entered after the operation for confirming the information on the "location of occurrence". Further, the detailed screen of a penal offense (1) is automatically selected and displayed on the right half screen in accordance with the result of primary entry of "property damage" for the above "case name 1".

FIG. 10B shows an example of the display of an information entry screen (penal offense (1)). The "gender" of the suspect has the keyword "male" provisionally entered as a result of a hit of the word "gangster" in the handwritten memo in the gender table of FIG. 12C. Further, the "perpetrator type" of the suspect has provisionally entered in it the keyword "gangster" as a result of a hit of the word "mobster" in the handwritten memo in the perpetrator type table of FIG. 13A. Further, while not shown, the "number" of suspects similarly has "2", provisionally entered. The information of the rest of the fields is not known from the information obtained at that point of time.

Note that the "gender" of the perpetrator (suspect) may also be provisionally entered as "male" in advance as default information and changed by the extracted information only when a contradictory primary entry information "female" etc. is extracted. Note that police statistics show that it is possible to provisionally enter into the display fields "gender of suspect", "gender of injured party", and "gender of caller" "male" and enter "American" into the "nationality of caller" or "yes" for "able to speak English" as default information.

Returning to FIG. 6, at step S21, processing is performed for confirming the above primary entry information. Note that it is possible to continue obtaining information and provisionally entering it, but by confirming important primary entry information as fast as possible at that time (case name, time of occurrence, location of occurrence, station in charge, etc.), it becomes possible for a command console 53 monitoring the receiving console 52 (displaying the same screen and hearing the same conversation etc.) to issue instructions and orders quickly and thereby start the initial investigation and solve the case faster.

Figure 8A:
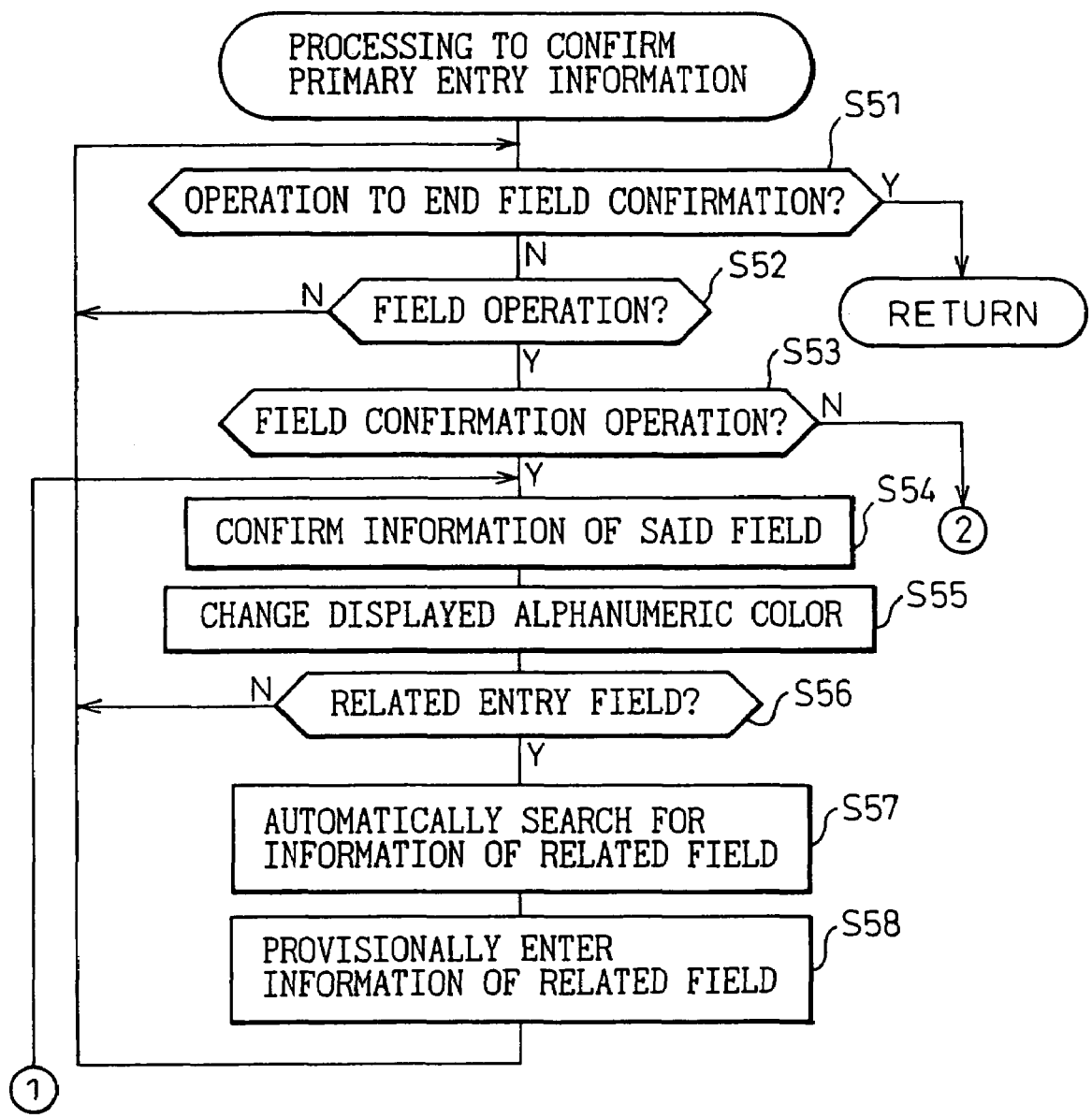

FIGS. 8A and 8B are a flow chart of the processing for confirmation of primary entry information. At step S51, the CPU 11 judges if an operation has been performed for ending the confirmation of fields (operation possible from keyboard 17, digitizer 31, pointing device 18, etc., same below). When no operation has been performed to end the confirmation of the fields, at step S52 it is judged if a field operation has been performed (simple operation for selection of field, operation for confirmation of field, etc.) When a field operation has been performed, at step S53, it is judged if an operation has been performed to confirm a field. When an operation has been performed to confirm a field, at step S54, the primary entry information of the selected field is confirmed and, at step S55, the display alphanumeric color is changed from yellow to a color expressing confirmation, for example, red (or green etc.)

At step S56, it is judged if there is another display field relating to the confirmed information. When there is no related field, the routine returns to step S51. When there is a related field, at step S57, the information of the related field is automatically searched for. For example, when the information on the "location of occurrence" of the case is confirmed, the information of the "station in charge" can be automatically provisionally entered along with it. At step S58, the information of the search result is provisionally entered into the related field and then the routine returns to step S51. Note that the information of the primary entry can be confirmed by the next operation.

Further, when it is judged at step S53 that no operation to confirm a field has been performed, the operation is a simple one of selection of a field. Note that a simple operation of selection of a field includes an operation where the processor moves the cursor (mouse pointer) by himself to manually select a new display field and automatic selection of a field in the primary entry state by the CPU 11 (display field selection and control means) in accordance with a predetermined priority order determined in advance by the importance, degree of urgency, etc. for each display field in the primary entry state.

At step S59, a list of candidates of the secondary entry A (selection option information) is automatically (window) displayed near a display field when there is secondary entry A information for that display field. At step S60, it is judged if a single-action selection operation has been performed on the candidate list. When a single-action selection operation has been performed, the primary entry information of the display field in question is replaced by the selected information (secondary entry A). Further, the routine returns to step S54, where the information in the display field is confirmed by the selected information.

Note that the "single-action selection operation" means a method of operation such as pointing to a display field by the mouse 18 or tenkey selection and entry of a number of the listed display field by the keyboard 17. Another method is the double-action method of operation of "cursor (field) selection"+"return (execute)" using the cursor movement keys and cursor return key (execute key) of the keyboard 17.

Further, when there is no secondary entry A information at the above step S59 or when there is no selection operation as judged at the above step S60, at step S62 it is judged if there has been a keyboard entry operation (operation for entering alphanumeric string from keyboard). When there has been a keyboard entry operation, at step S63, the information of the display field is secondarily entered (secondary entry B key entry) by any entered alphanumeric string from the keyboard 17. This entry includes changes of the information of the display field, insertions, deletions, etc. Next, the routine returns to step S54, where the information of the display field is confirmed by the information after key entry.

When it is judged at step S62 that there is also no keyboard entry operation, at step S64 it is judged if there has been a digitizer entry operation (for example, operation for entry of handwritten alphanumeric string in field-specific handwritten entry space 31*d*). When there has been a digitizer entry operation, at step S65, the information of the display field is secondarily entered (secondary entry B handwritten entry) by any entered alphanumeric string from the digitizer 31. Next, the routine returns to step S54, where the information of the display field is confirmed by the information after digitizer entry.

Note that while not shown, when it is judged at step S64 that there is also no digitizer entry operation, it is judged if there has been a voice entry operation (for example, it can be judged according to whether the speech recognition unit 33 has been manually activated and a voice signal is recognized from the microphone). When there has been a voice entry operation, the information of the display field is secondarily entered (secondary entry B speech entry) by any recognized alphanumeric string from the speech recognition unit 33. Next, the routine returns to step S54, where the information of the display field is confirmed by the information after speech entry.

In this way, in the present embodiment, since information can be entered automatically by secondary entry B from the entry system activated by the processor, the user-friendliness is good. Next, finally, the routine returns to step S51.

At this time, however, if the processor again selects an already confirmed display field, the flow proceeds to step S53, where the display color of the alphanumerics (red color etc.) is not changed, but the information of the display field can be reentered (changed). When the processor confirms the information of part or all of the fields requiring fast confirmation in the primary entry information in this way, he performs an operation to end the field confirmation at that time and thereby skips this processing.

Note that above an explanation was made of the case of confirming information for each display field, but for example it is also possible to provide something like a full confirmation key (or full confirmation touch entry area in the digitizer 31) and depress the key to confirm all of the primary entry information at that time all at once.

Returning to FIG. 6, at step S22, it is judged if there has been an operation to end the obtaining of case information. When there has not been an end operation, the processor continues to obtain case information at step S23 and enters a memo by handwriting in the handwritten free entry space 31b of the digitizer 31. At step S24, the handwritten alphanumeric string is recognized and, at step S25, the word strings are extracted. At step S27, processing is performed for primary entry of the information of all of the plurality of display fields based on the search results. Next, the routine returns to step S21, where the primary entry information is confirmed. When it is finally judged at step S22 that there has been an operation to end the obtaining of information, the routine proceeds to FIG. 7.

Figure 7:
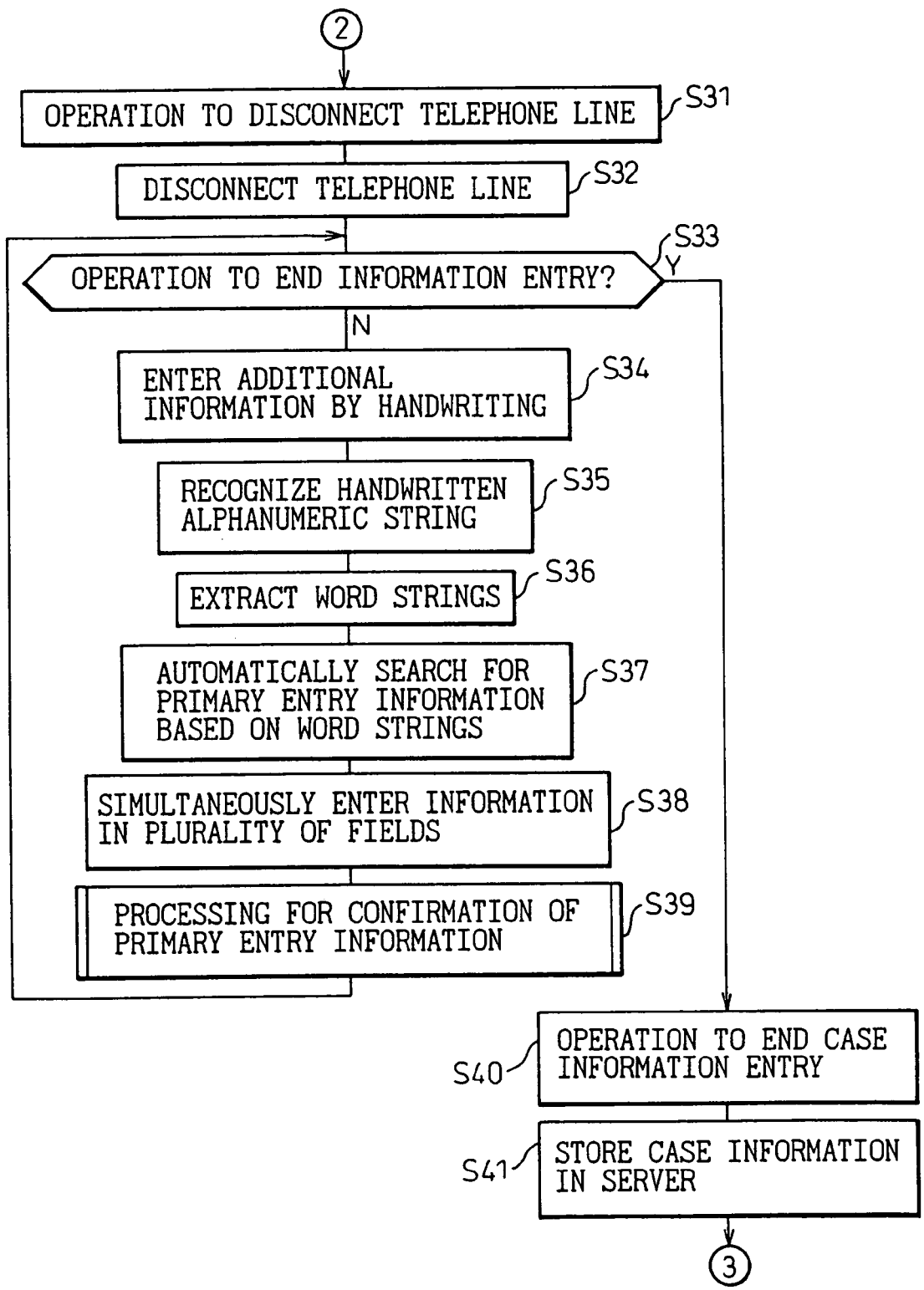
FIG. 7 is a third part of a flow chart of information entry processing according to an embodiment of the present invention.

In FIG. 7, at step S31, the processor performs an operation to disconnect the telephone line (presses restore key) at the call routing operation panel 14. Due to this, at step S32, the CIF 15 (PBX 51) disconnects the telephone line. At step S33, the CPU 11 judges if there has been an operation to end the series of information entry operations (operation to end information entry). When there has not been such an end operation, at step S34, the processor enters additional information (information for display fields not yet filled in etc.) by handwriting in the handwritten free entry space 31b for example. At step S35, the handwritten alphanumeric string is recognized and, at step S36, the word strings are extracted. At step S37, an automatic search is conducted for the primary entry information based on the extracted word strings. At step S38, processing for simultaneous primary entry is performed on a plurality of display fields. At step S39, processing is performed for confirmation of the primary entry information and then the routine returns to step S33. The operation of entering additional information is repeated to the necessary extent. At this time, it is also possible to make joint use of entry of information from the keyboard 17 or entry of information from the field-specific entry space 31d of the digitizer 31.

When it is finally judged at step S33 that there has been an operation to end all information entry, the handwritten alphanumeric recognition processing etc. are ended along with this, then, at step S40, the processor performs an operation to end the entry of the case information (selects the field "end all" on the CRT screen etc.) By this, the information entry screen being handled (case screen, detailed screen, processing result screen, etc.) is also automatically closed. At step S41, the CPU 11 stores all of the information produced relating to the case in the server (command and control server) 56 through the local area network 55. Further, the processing of the receiving console 52 returns to step S2 of FIG. 5, where the console waits for the receipt of the next emergency call.

On the other hand, the display information of the receiving console 52 and the voice conversation of the caller and the processor etc. are monitored by the successively responding command console 53 and, if necessary, the master command console 54 through the local area network 55 and suitable instructions and orders are issued from the command console 53 to the police station 60 in charge so the caller can obtain speedy and accurate aid.

Further, case information once stored in the server 56 can be later freely called up on the screen and reused (referred to, updated, etc.) at any time (for example, when a receiving console 52 is in the middle of obtaining information on another case or in the middle of processing for entry of the primary entry information) from any of a receiving console 52 receiving another case or command console 53 or master command console 54 executing the work of providing instructions for the previous case.

While the invention has been described with reference to specific embodiments chosen for purposes of illustration, it should be apparent that numerous modifications could be made thereto by those skilled in the art without departing from the basic concept and scope of the invention.

The invention claimed is:

1. An information entry apparatus comprising:
an alphanumeric entry unit for entering alphanumeric string information,
a display unit for displaying keywords comprised of predetermined alphanumeric strings in a plurality of corresponding fields on a display screen,
a word dictionary for storing a plurality of keywords, each keyword being identified in said word dictionary as corresponding to only one of the plurality of fields corresponding to keywords and to a plurality of similar words for deducing the keyword,
an alphanumeric information processing unit for cutting out predetermined word strings from the entered alphanumeric string, searching through the word dictionary by the cut out words, extracting a corresponding group of keywords from the dictionary for which matches are obtained by comparison of the cut out words with ones of the group of keywords of the dictionary and the pluralities of similar words, and displaying each extracted keyword in its corresponding field on the display unit, and
a conjugated alphanumeric string information dictionary for storing conjugated alphanumeric string information comprised of a plurality of sets of alphanumeric string information elements, wherein
the alphanumeric information processing unit searches through the conjugated alphanumeric string information dictionary by predetermined words cut out from the entered alphanumeric string and extracts the overall conjugated alphanumeric string information for which matches are obtained by comparison of the predetermined words cut out from the entered alphanumeric string with part or all of the conjugated alphanumeric string information in the dictionary and displays the same in the corresponding fields of the display unit.

2. The information entry apparatus as set forth in claim 1, wherein the alphanumeric information processing unit searches through the word dictionary by the entered alphanumeric string and successively cuts out from the entered alphanumeric string as predetermined words the words of portions for which matches are obtained by comparison with the keywords of the dictionary or similar words.

3. The information entry apparatus as set forth in claim 1, further comprising a form dictionary for storing a plurality of form information corresponding to a plurality of types of display formats and one or more keywords corresponding to the form information linked with each of the form information, wherein
the alphanumeric information processing unit refers to the form dictionary by a keyword displayed in a predetermined display field of a first screen, extracts the corresponding form information from the dictionary column for which a match is obtained by comparison with the keywords of the dictionary, and displays the screen of the display format corresponding to the form information on a second screen.

4. The information entry apparatus as set forth in claim 1, wherein the alphanumeric information processing unit is provided with a first entry mode for designating keywords displayed all at once in corresponding fields of the display unit as provisional primary entries and for displaying the keywords of the primary entries by a first alphanumeric color.

5. The information entry apparatus as set forth in claim 4, wherein the alphanumeric information processing unit is provided with a second entry A mode where one of a plurality of keywords extracted for one display field of the display unit is displayed in the corresponding display field, the remaining keywords are displayed in a list in a display area near the display field, and a keyword displayed in a corresponding display field is replaced by a keyword selected in accordance with a predetermined manual selection operation on the list of keywords.

6. The information entry apparatus as set forth in claim 4, wherein the alphanumeric information processing unit is provided with a secondary entry B mode where the keyword of the primary entry is directly changed or replace by alphanumeric information entered from the alphanumeric entry unit.

7. The information entry apparatus as set forth in claim 4, further comprising an individual confirmation instruction unit for individually manually confirming the information of a display field in the primary entry state, wherein
the alphanumeric information processing unit designates the information of the display field as being confirmed in accordance with an instruction operation of the individual confirmation instruction unit on the selected display field.

8. The information entry apparatus as set forth in claim 7, wherein further provision is made of a display field selection control unit for sequentially selecting display fields in the primary entry state by a priority order determined corresponding to the display fields in advance.

9. The information entry apparatus as set forth in claim 4, further comprising a full confirmation instruction unit for enabling manual colon of all of the display fields of the primary entry state all at once, wherein
the alphanumeric information processing unit designates the information of all of the display fields in the primary entry state as confirmed all at once in accordance with an instruction operation of the full confirmation instruction unit.

10. The information entry apparatus as set forth in claim 7, wherein the alphanumeric information processing unit has the information of the display fields in the confirmed state displayed by a second alphanumeric color different from the first alphanumeric color.

11. An emergency call system for processing information provided by a subscriber to an operator upon said subscriber's making of an emergency call comprising the information entry apparatus of claim 1.

12. An information entry apparatus comprising;
an alphanumeric entry unit for entering alphanumeric string information,
a display unit for displaying keywords comprised of predetermined alphanumeric strings in a plurality of corresponding fields on a display screen,
a word dictionary for storing a plurality of keywords, each keyword being identified in said word dictionary as corresponding to only one of the plurality of fields corresponding to keywords and to a plurality of similar words for deducing the keyword,
an alphanumeric information processing unit for cutting out predetermined word strings from the entered alphanumeric string, searching through the word dictionary by the cut out words, extracting a corresponding group of keywords from the dictionary for which matches are obtained by comparison of the cut out words with ones of the group of keywords of the dictionary and the pluralities of similar words, and displaying each extracted keyword in its corresponding field on the display unit, and
a keyword dictionary for storing a plurality of first keywords corresponding to predetermined display fields of the display unit and a plurality of second keywords in a predetermined relation with the first keywords linked with each of the first keywords, wherein
the alphanumeric information processing unit searches trough the keyword dictionary by a second keyword displayed in another predetermined display field of the display unit, extracts a corresponding first keyword from the dictionary column for which a match is obtained by comparison with the second keyword of the dictionary, and displays the same in a predetermined display field;
wherein the first keyword corresponds to only the predetermined display field.

13. An information entry apparatus comprising:
an alphanumeric entry unit for entering alphanumeric string information,
a display unit for displaying keywords comprised of predetermined alphanumeric strings in a plurality of corresponding fields on a display screen,
a word dictionary for storing a plurality of keywords, each keyword being identified in said word dictionary as corresponding to only one of the plurality of fields corresponding to keywords and to a plurality of similar words for deducing the keyword, and
an alphanumeric information processing unit for cutting out predetermined word strings from the entered alphanumeric string, searching through the word dictionary by the cut out words, extracting a corresponding group of keywords from the dictionary for which matches are obtained by comparison of the cut out words with ones of the group of keywords of the dictionary and the pluralities of similar words, and displaying each extracted keyword in its corresponding field on the display unit, wherein
the alphanumeric entry unit is provided with a keyboard, a digitizer and a handwritten alphanumeric recognition unit for recognizing a handwritten alphanumeric string for entry into the digitizer, and/or a microphone and a speech recognition unit for recognizing the speech entered into the microphone.

14. The information entry apparatus as set forth in claim 13, wherein
the digitizer is provided with a handwritten free entry space of a handwritten entry free format, and
the alphanumeric processing unit cuts out predetermined word strings from the alphanumeric string handwritten in the handwritten free entry space and recognized by the alphanumeric recognition unit in the order of the handwritten alphanumerics.

15. The information entry apparatus as set forth in claim 14, wherein the digitizer is provided with field-specific handwritten entry spaces enabling handwritten alphanumeric strings to be directly entered into corresponding designated fields of the display screen and the sizes of the handwritten free entry space and/or field-specific handwritten entry spaces can be changed independently of each other or linked with each other in accordance with a predetermined manual operation.

16. The information entry apparatus as set forth in claim 13, wherein the alphanumeric information processing unit executes the primary entry mode of the sixth aspect, the secondary entry A mode of the seventh aspect, and the secondary entry B mode of the eighth aspect in a predetermined sequence and executes the secondary entry A mode after the end of the primary entry mode when a display field is selected for which a plurality of keywords have been extracted and executes the secondary entry B mode in other cases.

17. The information entry apparatus as set forth in claim 16, wherein the alphanumeric information processing unit processes the keyed in alphanumeric string from the keyboard at the time of start of execution of the secondary entry B mode or during the execution of the same when a alphanumeric entry operation is performed on the keyboard processes the recognized alphanumeric string from the handwritten alphanumeric recognition unit in the secondary entry A mode when a handwritten alphanumeric entry operation is performed on the digitizer, and processes the recognized alphanumeric string from the speech recognition unit in the secondary entry B mode when speech is entered into the microphone.

* * * * *